United States Patent [19]

Blair

[11] 3,929,369
[45] Dec. 30, 1975

[54] AIR DEFLECTING VANE ASSEMBLY FOR A VEHICLE
[75] Inventor: Clarence I. Blair, Wichita, Kans.
[73] Assignee: Blair-Lefler, Inc., Wichita, Kans.
[22] Filed: Mar. 19, 1973
[21] Appl. No.: 342,889

[52] U.S. Cl. ............... 296/1 S; 180/1 FV; 296/91
[51] Int. Cl.² ...................................... B62D 37/02
[58] Field of Search ............ 296/1 S, 91; 180/1 FV; 105/2 R, 2 A

[56] References Cited
UNITED STATES PATENTS

| | | | |
|---|---|---|---|
| 2,037,942 | 4/1936 | Stalker | 296/1 S X |
| 2,046,042 | 6/1936 | Turner | 180/1 FV |
| 2,122,422 | 7/1938 | Huet | 105/2 A X |
| 2,863,695 | 12/1958 | Stamm | 296/1 S |
| 2,933,344 | 4/1960 | Shumaker | 296/91 |
| 3,010,754 | 11/1961 | Shumaker | 296/1 S |
| 3,214,215 | 10/1965 | Hansen | 296/91 |
| 3,348,873 | 10/1967 | Saunders | 296/1 S |
| 3,419,897 | 12/1968 | Bratsberg | 296/91 |
| 3,596,974 | 8/1971 | Adams | 296/1 S |
| 3,695,673 | 10/1972 | Meadows | 296/1 S |

Primary Examiner—Robert J. Spar
Assistant Examiner—Leslie J. Paperner
Attorney, Agent, or Firm—John H. Widdowson

[57] ABSTRACT

An air current deflector for a vehicle has an above the roof air current turn vane mounted in spaced relation above the roof of the vehicle. In a preferred specific embodiment a forward air current deflecting vane is mounted on the vehicle juncture of the vehicles front with the windshield and the roof of the vehicle. In another preferred specific embodiment a nose air current deflecting vane is mounted on the front surface of the vehicle. In still another preferred specific embodiment another air current deflecting vane is mounted vertically along a corner of the vehicle. In still another preferred specific embodiment another air current deflecting vane is mounted vertically over a forward surface of the vehicle. The deflector is constructed and adapted to deflect air currents striking the vehicle to pass same over and by the vehicle in streamline flow and can be used with tractor-trailers, fixed bed trucks, vans, stationwagons, and the like.

11 Claims, 24 Drawing Figures

U.S. Patent    Dec. 30, 1975    Sheet 1 of 5    3,929,369
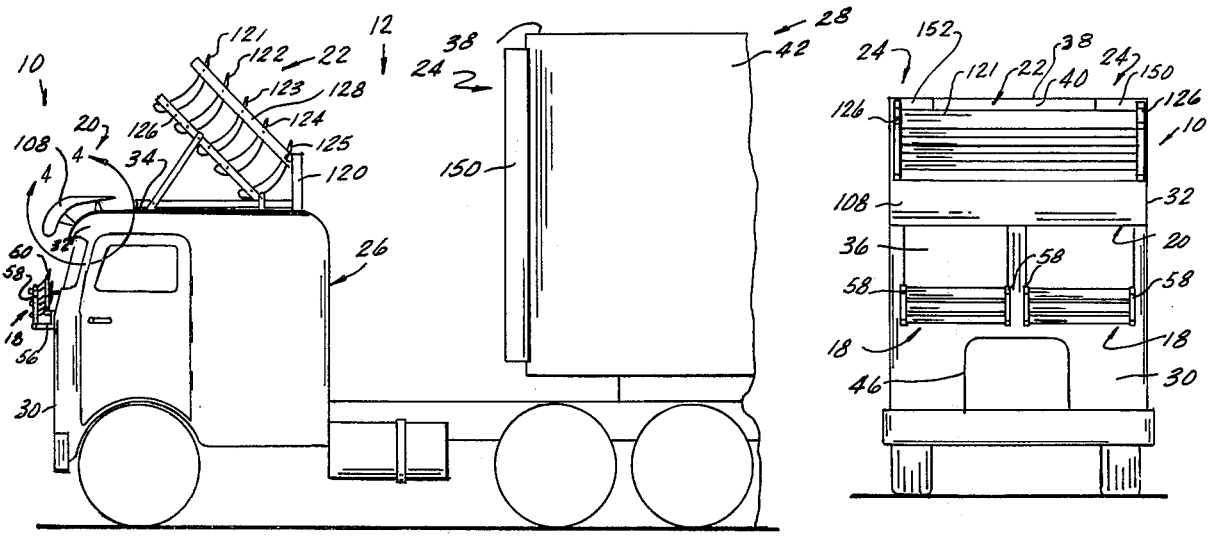
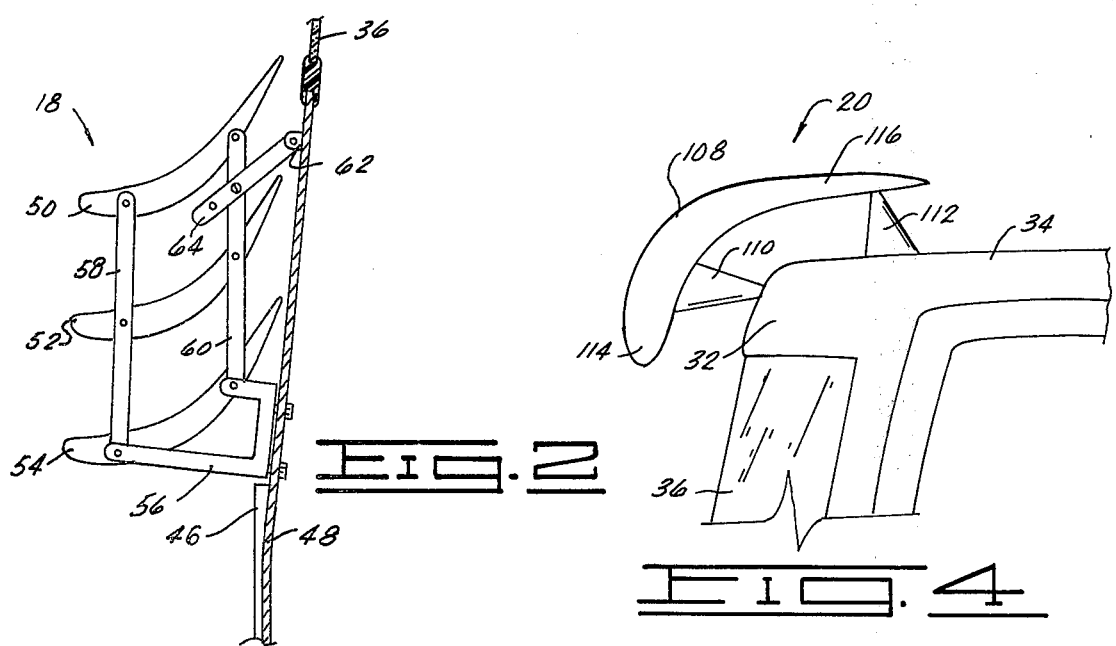
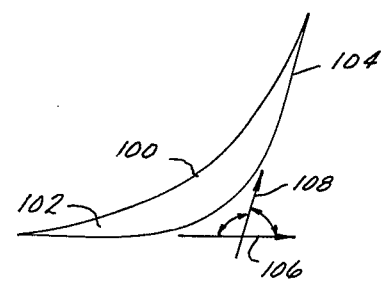
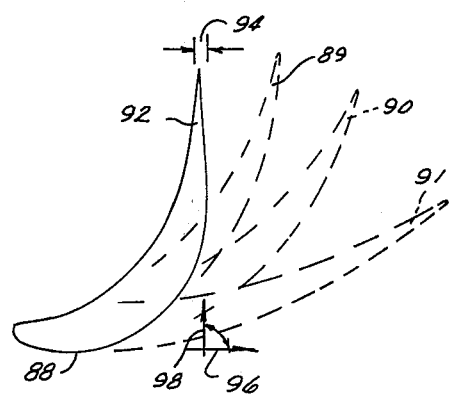

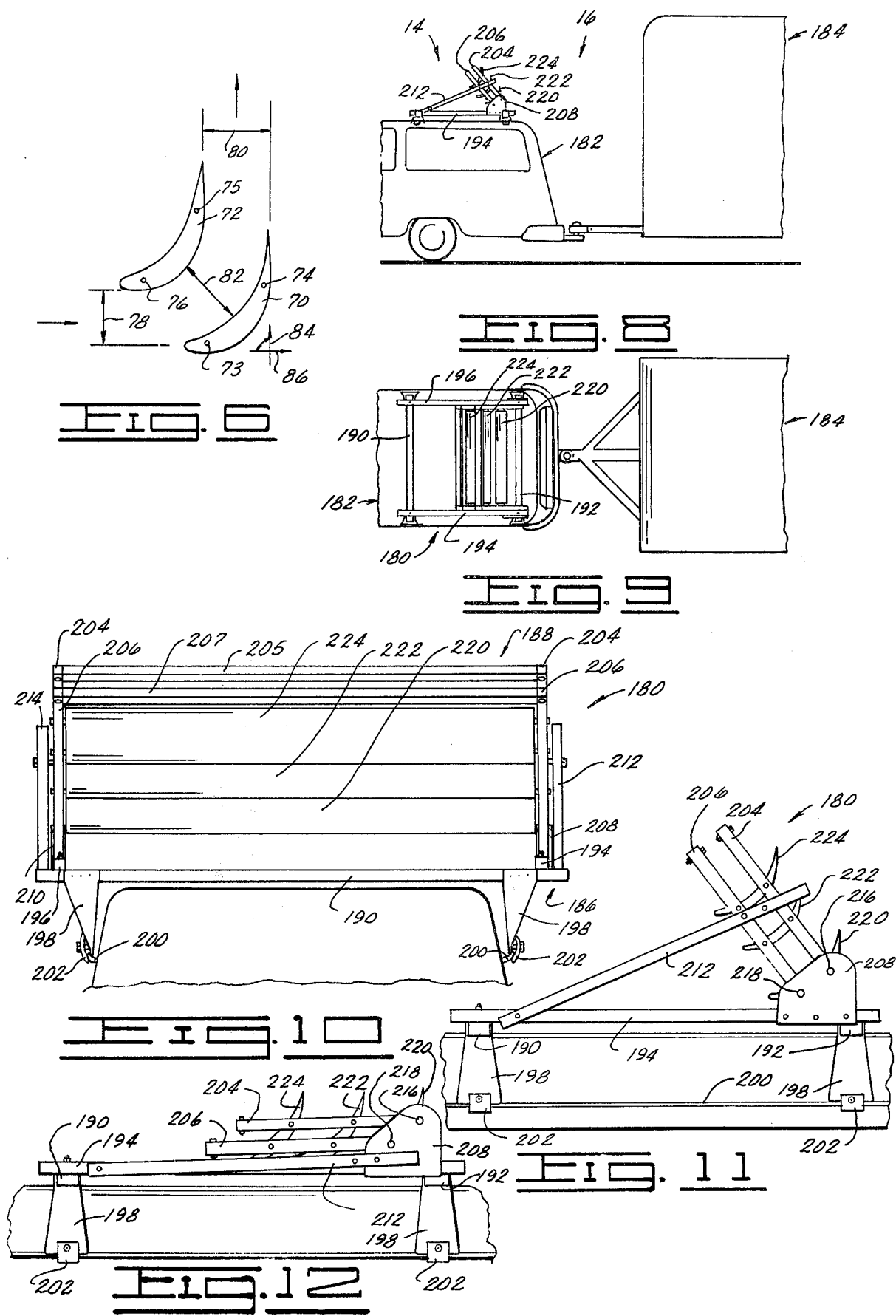

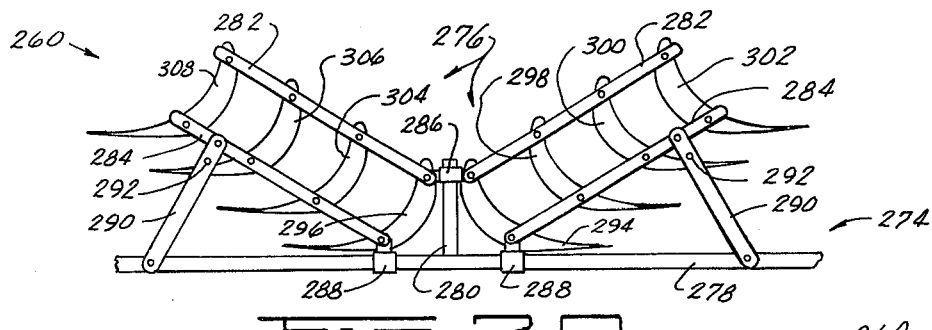
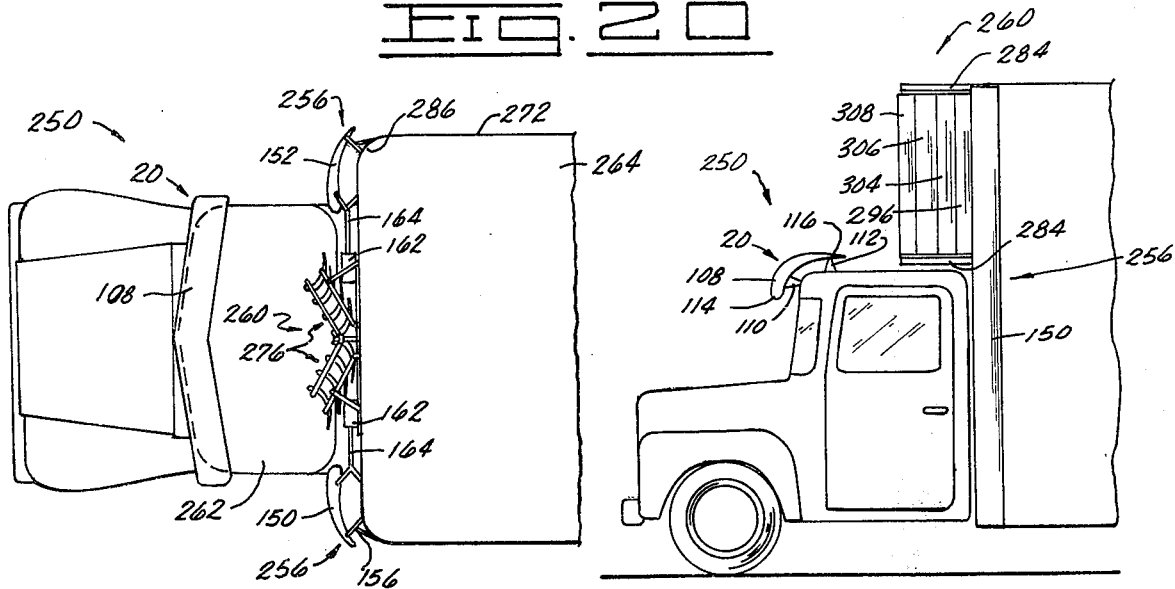
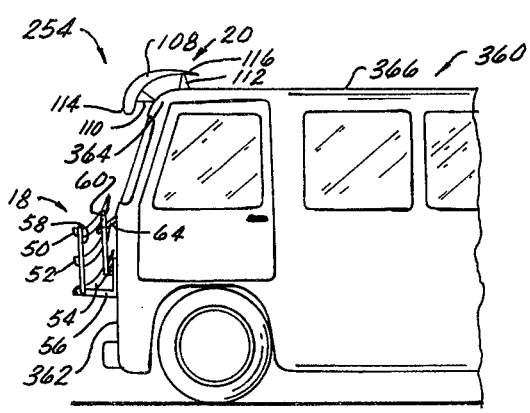
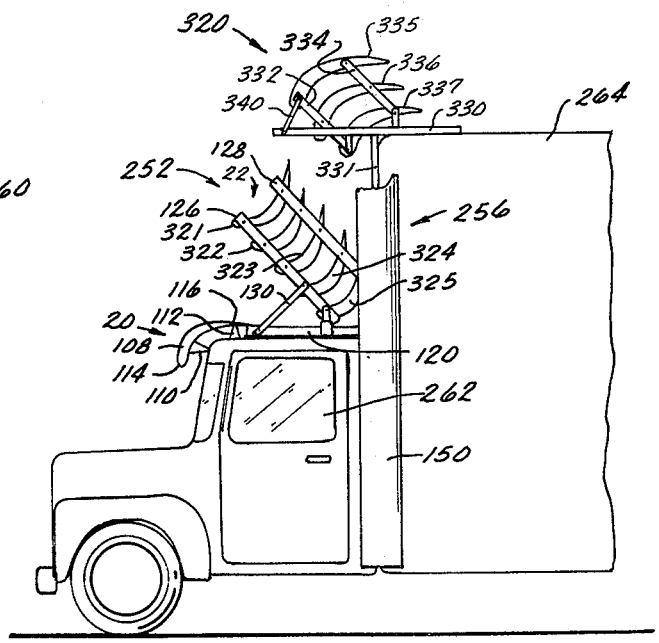

AIR DEFLECTING VANE ASSEMBLY FOR A VEHICLE

In the prior art numerous devices are known which are attachable to the structure of the vehicles for the purpose of reducing the air drag thereof while the vehicles are in motion. Some of the prior art devices rely on controlling the boundary layer of air which is immediately adjacent to the vehicles outer surface. Generally these devices utilize specially shaped bodies attached to the vehicle's structure to direct the air around the vehicle and shield it from the oncoming air flow by the boundary layer of air immediately adjacent to the vehicle's surface. Some of these prior art devices utilize auxiliary power plants and auxiliary fans to alter the boundary layer flow of air. Other types of air drag reducing structures adapted for use with tractor-trailer trucks have a conduit like assembly attached to the rear of the truck cab and another conduit like assembly attached to the leading portion of the trailer with the function of the conduit structures being to pass air from the rear of the tractor to directly to the leading portion of the trailer. Another air drag reducing device used with tractor-trailer trucks is an air deflector mounted on top of the truck cab and extending upward therefrom to deflect the oncoming air over the trailer. Other air current deflecting devices are known which are usable on a vehicle such as automobiles when pulling a trailer that is taller than the automobile, however, these devices are primarily deflector shields and have a flat plate like structure to deflect the air by altering the aerodynamic shape of the vehicles.

In one specific embodiment an air current deflecting vane assembly for a vehicle includes a vane assembly mountable with the tractor of a tractor-trailer truck and a vane assembly mountable with the forward corners of the trailer. In this embodiment the tractor mounted vane assembly includes a nose vane assembly mountable on the front surface of the cab below the windshield, forward vane assembly mountable on the upper forward vane assembly mountable on the upper forward corner of the cab above the windshield area and a roof top vane assembly mountable on the roof of the tractor cab. The nose vane assembly turns an air current striking the forward surface of the cab to direct it upward along the front surface, the forward vane assembly turns the upwardly moving air current directing it rearwardly over the roof of the cab, and the roof top vane assembly turns the air rearwardly moving air current directing same so it will pass over the top of the trailer. The trailer mounted vane assembly has a pair of retractably mounted vanes on the forward upright corners of the trailer which are adapted to turn an air current striking the forward surface of the trailer so as to direct it around the corner of the trailer. The combined effect of the vane assembly mounted with the tractor-trailer vehicle is to reduce the air and drag forces on the vehicle and consequently provide for a more efficient and more economical operation thereof.

In another specific embodiment, the air current deflecting vane assembly for a vehicle is adapted for use with a stationwagon or like type vehicle pulling a travel trailer or the like which is taller than the towing vehicle. The drag reducing vane assembly of this embodiment includes a roof top vane assembly mountable with the roof of the towing vehicle. The roof top vane assembly is constructed and adapted to turn the air current normally moving rearward on the roof of the towing vehicle so as to direct it over the attached trailer vehicle. The overall result of the drag reducing vane assembly of this embodiment is to reduce the air drag forces on the towing vehicle and attached trailer vehicle and consequently provide for a more efficient and more economical operation thereof.

In another specific embodiment, the air deflecting vane assembly for a vehicle is adapted for use with a truck of the type having the cab and the cargo body mounted with the same chassis. Generally, this type of truck has the cargo body extending beyond the cab on the sides thereof and above the top thereof. The vane assembly of this embodiment includes a forward vane assembly mountable on the upper forward corner of the cab above the windshield, a roof top vane assembly mountable on or over the roof of the cab and having a plurality of generally vertically mounted vanes, and a corner vane assembly mountable on the forward corners of the cargo body. The forward vane assembly has a vane member mountable above the forward upward corner of the cab above the windshield to turn an upwardly moving air current directing same rearwardly over the roof of the cab. The roof top vane assembly turns a rearwardly moving air current passing over the roof of the cab directing same to the sides of the cargo body. The corner vane assembly has a pair of retractable mountable vanes on the forward upright corners of the cargo body which are adapted to turn the air current which is deflected by the roof top vane assembly so as to direct it around the corners of the cargo body. The overall result of the vane assembly of this embodiment is to reduce the air drag forces on the truck vehicle when in forward motion and provide a more efficient and more economical operation thereof.

In another specific embodiment of the air deflecting vane assembly for a vehicle is adapted for use with a truck of the type having the cab and the cargo body thereof mounted with the same chassis. Generally, this type of truck has the cargo body extending to the sides and top beyond the dimensions of the cab. The air current deflecting vane assembly of this embodiment includes a roof top vane assembly mountable with the rear of the cab, a forward vane assembly mountable with the roof of the cab on the forward corner of the cab above the windshield area, a corner vane assembly mountable with the forward corners of the cargo body, and a cargo body forward vane assembly mountable on the upper forward corner of the cargo body. The forward vane assembly turns an upwardly moving air passing over the windshield directing it rearwardly over the roof of the cab. The roof top vane assembly turns an air current moving rearwardly over the top of the cab directing same so it will pass upward on the forward surface of the cargo body. The corner vane assembly has a pair of retractably mounted vanes on the forward upright corners of the cargo body which are adapted to turn an air current striking the forward surface of the cargo body so as to direct it around the corners of same. The cargo body forward vane assembly has transversely mounted vanes adapted to turn the upwardly moving air current from the roof top vane assembly and direct it rearwardly over the top of the truck's cargo body. The overall result of the air deflecting vane assembly of this embodiment is to reduce air drag forces on the truck when in forward motion, and consequently provide for a more efficient and more economical operation thereof.

Another specific embodiment, the air deflecting vane assembly for a vehicle is adapted for use with a van type vehicles or the like.

This embodiment can be used with vehicles having a generally bluff front surface and a body of generally uniform cross-section such as buses, vans, motor homes and certain automobiles.

In this embodiment the vane assembly includes a nose vane assembly mountable on the front surface of the vehicle below the windshield and a forward vane assembly mountable on the upward forward corner of the vehicle above the windshield area. The nose vane assembly turns an air current which would strike the forward surface of the vehicle and direct it upward over the front surface and over the windshield thereof. The forward vane assembly turns the upwardly moving air current passing over the windshield and directs it rearwardly over the top of the vehicle. The combined effect of the vane assembly of this embodiment is to reduce the air drag forces on the vehicle when in forward motion and consequently provide a more efficient and more economical operation thereof.

One object of this invention is to provide an air current deflecting vane assembly for a vehicle overcoming the aforementioned disadvantages of the prior art devices.

Still, one other object of this invention is to provide an air current deflecting vane assembly that is an air drag reducing vane assembly for a vehicle which can be used with a vehicle pulling a trailer such as a tractor-trailer type truck vehicle to reduce the air drag or air resistance of the trailer.

Still, another object of this invention is to provide an air deflecting and drag reducing vane assembly for a vehicle which can be used on a stationwagon like vehicle or similar vehicle pulling a travel trailer or a trailer which is taller than the pulling vehicle.

Yet, another object of this invention is to provide an air deflecting and drag reducing vane assembly for a vehicle which has a roof top vane assembly mountable with the rear portion of a stationwagon like vehicle or a similar vehicle for use when pulling a travel trailer or the like that is taller than the vehicle on which the vane assembly is attached for the purpose of reducing air drag forces on the vehicle when in forward motion.

Yet, another object of this invention is to provide an air deflecting and air drag reducing vane assembly for a vehicle, which is adapted for use with tractor-trailer trucks and which has a nose vane assembly mounted on the forward surface of the truck cab to direct an air current striking the forward surface of the cab turning upward along the upper forward portion of the cab, and having a forward vane assembly mounted on the upper forward corner of the cab to turn the upwardly moving air current directing same rearwardly over the roof of the cab, and having a roof top vane assembly mountable with the roof of the cab to turn the rearwardly moving air current from the roof of the cab directing it upward so it will pass over the top of the trailer, and additionally having a vane assembly on the forward upright outer corner portions of the trailer which is adjustably extendable and retractable and adapted to direct an air current striking the forward surface of the trailer turning same around the corners of the trailer to the side of the trailer.

Yet, another object of this invention is to provide an air deflecting and drag reducing vane assembly for a vehicle which is adapted for use with trucks that have a general bluff body configuration with the cab thereof and the cargo body thereof mounted with the same chasis; the vane assembly having a forward vane assembly mounted on the upward forward corner of the cab to turn an upwardly moving air current directing same rearwardly over the roof of the cab, having a roof top vane assembly mountable on the roof of the cab to turn the rearwardly moving air currents directing it upwardly on the forward surface of the cargo body, and having a corner vane assembly mountable on the forward upright corner portions of the cargo body to direct an air current striking the forward surface of the cargo body turning the air current around the corners of the cargo body to the side of same, and additionally having a cargo body forward vane assembly on the upper forward portion of the top of the cargo body to direct the upwardly moving air current from the roof top vane assembly turning same around the forward corner of the cargo body onto its top.

Yet, another object of this invention is to provide an air deflecting and drag reducing vane assembly for a vehicle which is adapted to use with trucks, that have a general bluff configuration with the cab and cargo body thereof mounted on the same chassis which has the cargo body extending past the sides and top of the cab; the vane assembly having a forward vane assembly mountable on the upper forward corner of the cab above the windshield to turn an upwardly moving air current directing same rearwardly over the roof of the cab, and having a roof top vane assembly with vertically mounted vanes to turn the rearwardly moving air current passing over the roof of the cab directing it toward the sides of the cargo body, and additionally having a corner vane assembly on the forward upright corners of the cargo body to direct the air current from the roof top vane assembly and other air currents striking the forward surface of the cargo body turning them around the corners of the cargo body to the sides thereof.

Yet, another object of this invention is to provide an air deflecting and drag reducing vane assembly for a vehicle which is adapted for use with van type vehicles or like vehicles which have a substantially bluff front surface and an elongated body of generally uniform cross-section; the vane assembly having a nose vane assembly mountable with the forward surface of the vehicle to direct an air current striking the forward surface turning same upward over the forward surface and over the windshield thereof, and additionally having a forward vane assembly mountable on the upper forward corner of the vehicle above the windshield area thereof to turn the upwardly moving air current directing it rearwardly over the top of the vehicle.

Still, another object of this invention is to provide an air deflecting or drag reducing vane assembly for a vehicle which can be used with a vehicle pulling a trailer such as a tractor-trailer type truck to reduce the air drag or air resistance forces on the trailer thereof, the vane assembly having a roof top vane assembly mountable on or over the roof of the tractor cab or on the forward surface of the trailer body and having a plurality of vertically oriented vanes adapted to deflect an air current moving rearwardly over the top of the cab turning same toward the sides of the attached trailer vehicle.

Various other objects, advantages, and features of the invention will become apparent to those skilled in the art from the following discussion, taken in conjunction with the accompanying drawings, in which:

FIG. 1 is a side elevation view of the front portion of a tractor-trailer truck showing the tractor and the forward portion of the trailer and having the air deflecting and drag reducing vane assembly mounted therewith;

FIG. 2 is an enlarged end elevation view of the nose vane assembly mounted on the truck cab showing the portion of the truck cab in cross section for clarity;

FIG. 3 is a reduced size front elevation view of the tractor-trailer truck shown in FIG. 1;

FIG. 4 is an enlarged end elevation view of the forward vane assembly taken on line 4—4 in FIG. 1;

FIG. 5 is a diagrammatical view illustrating the cross-sectional shape of a vane usable with the drag reducing vane assembly and having arrows thereon indicating the geometry of the vane;

FIG. 6 is a diagrammatical view of a cooperating pair of vanes illustrating the cross-sectional shape and spacing of the multi-vane structures of this invention with markings on the diagram indicating the geometry of the cooperating vanes;

FIG. 7 is a diagrammatical view of a vane illustrating the cross-sectional shape of a vane usable with the drag reducing vane assembly of this invention, the vane shown with a blunt leading edge portion, a tapered trailing edge portion, shown in dashed lines illustrating different possible shapes of the vane and the diagram including markings illustrating the geometry of the vane;

FIG. 8 is a side elevation view of the joining portions of a stationwagon type vehicle and a travel trailer-type vehicle, the stationwagon type vehicle having mounted on the rear portion of the roof thereof, roof top vane assembly;

FIG. 9 is a top plan view of the stationwagon type vehicle and trailer shown in FIG. 8;

FIG. 10 is an enlarged front elevation view of the roof top vane assembly shown in FIG. 8 on a portion of the roof;

FIG. 11 is a side elevation view of the roof top vane assembly shown in FIG. 10;

FIG. 12 is a side elevation view of the roof top vane assembly shown in FIG. 11 with the vane assembly in the lowered storage position;

FIG. 20 is a plan view of the roof top vane assembly having the vertically mounted vanes, taken from the end of the vane assembly along its elongated axis;

FIG. 21 is a top plan view of the forward end portion of a truck that has the cargo body adjacent to the cab, the truck having the forward vane assembly, the roof top vane assembly with vertically oriented vanes, and the cargo body vane assembly of this invention;

FIG. 22 is a side elevation view of the forward portion of the truck shown in FIG. 21;

Figure 13:
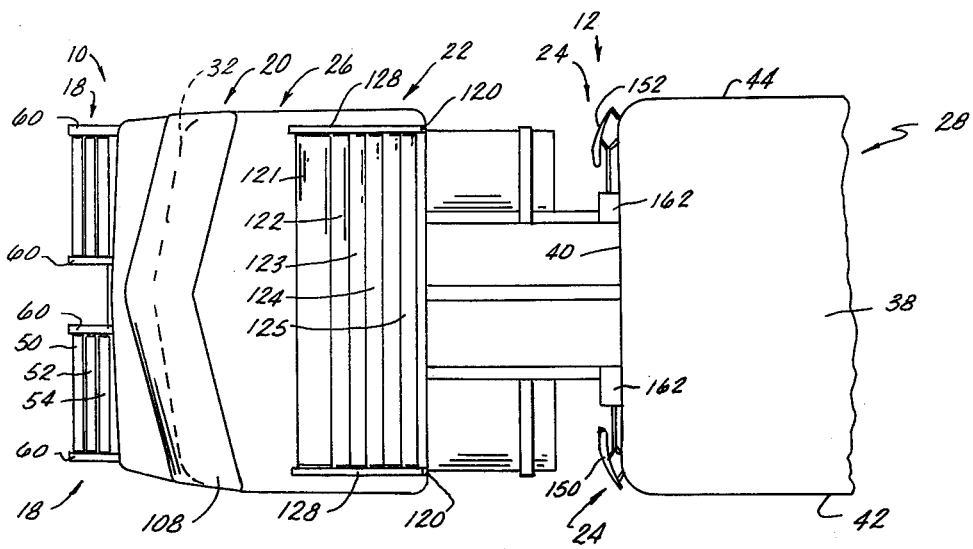
FIG. 13 is an enlarged top plan view of the tractor-trailer truck shown in FIG. 1.

FIG. 23 is a side elevation view of the forward portion of a truck having the cargo body adjacent to the cab, the truck having the forward vane assembly, the roof top vane assembly with horizontal vanes, the cargo body vane assembly, and the cargo body forward vane assembly of this invention; and FIG. 24 is a side elevation view of the forward portion of a van type vehicle; the van having the nose vane assembly and the forward vane assembly of this invention.

The following is a discussion in description of preferred specific embodiments of the air current deflecting or air drag reducing vane assembly for a vehicle of this invention such being made with reference to the drawings whereupon the same reference numerals are used to indicate the same or similar parts and/or structure. It is to be understood that such discussion and description is not to unduly limit the scope of the invention.

An embodiment, (1), of the air current deflecting or air drag reducing vane assembly of this invention is shown on Sheets 1 and 2 of the drawings, it is particularly adapted for a tractor-trailer truck or rig. The vane assembly is generally indicated at 10 and the tractor-trailer truck is generally indicated at 12. Another embodiment, (2), of the air current deflecting or air drag reducing vane assembly of this invention is shown on Sheet 2 of the drawings and is particularly adapted for a stationwagon or like vehicle pulling a travel trailer or the like. The drag reducing vane assembly of this embodiment is generally indicated at 14 with the stationwagon like vehicle and attached trailer generally indicated at 16. Another embodiment, (3), of the air current deflecting or drag reducing vane assembly of this invention is shown on Sheet 5 of the drawings, it is particularly adapted for a truck with the cargo body thereof adjacent to the cab on the same chassis with the cargo body extending beyond the sides and top of the cab. The vane assembly of this embodiment is generally indicated at 250 and shown in FIGS. 21 and 22. Another embodiment, (4), of the air current deflecting or drag reducing vane assembly of this invention is shown on Sheet 5 of the drawings in FIGS. 23 thereof. The vane assembly of this embodiment is generally indicated at 252 and is particularly adapted for use with a truck that has the cargo body adjacent to the cab on the same chassis with the cargo body extending beyond the sides and top of the cab. Another embodiment, (5), of the air current deflecting or drag reducing vane assembly of this invention is shown on Sheet 5 of the drawings in FIG. 24 thereof. The vane assembly of this embodiment is particularly adapted for use with vane type vehicles or like vehicles having a bluff front surface and an elongated body of a generally uniform cross-section, the embodiment is generally indicated at 254.

The embodiment, (1), of the air current deflecting or air drag reducing vane assembly for tractor-trailer trucks includes a nose vane assembly 18, on the forward surface of a truck cab; a forward vane assembly 20 mounted above on the upper forward corner portion of the truck cab; a roof top vane assembly 22 mountable on the roof of the truck cab; and a corner vane assembly 24 mountable on the forward upright corner portions of a trailer. The tractor has a cab 26 which is preferably of the generally rectangular construction as shown. The trailer 28 is of the rectangular body construction with the top thereof being above the roof of the tractor cab 26. The vane assembly 10 of this invention is adapted for use with tractor cabs of the general design shown in the drawing, however, such can be used with tractors having cabs with the forwardly extending engine compartment by deletion or modification of the nose vane assembly 18. When the tractor-trailer truck 12 is in forward motion the current of air strikes the cab 26 on its forward surface indicated at 30 and a portion of the air current is turned by the nose turning vane assembly 18 so as to direct it upward on the forward surface 30 and in the direction of the cabs forward corner portion 32. The cab's upward forward corner portion 32 is the juncture of the roof 34 with the forward surface 30 above the windshield 36. The forward vane assembly 20 is mounted at the cab's forward corner portion 32 and turns the upwardly directed air current so as to direct it rearwardly over the cab 26 above the roof 34. The roof vane assembly 22 is adapted to turn the rearwardly directed air current moving rearward over the roof 34 of the cab 26 and turn it into an upward and rearward direction so it will pass over the top of the trailer 24. The trailer's top 38, is usually a substantial distance above the roof 34 with the specific distance depending upon the particular tractor and trailer. The trailer vane assembly 24 is adapted to receive the air current striking the forward surface 40 of the trailer 28 and turn that air current around the corners of the trailer so that the air current passes generally along the trailer's sides 42 and/or 44, An air current will strike the trailer's forward surface 40 when the tractor-trailer truck 12 is in a cross-wind condition although air currents will strike the trailer's forward surface 40 on its lower portion when it is moving in a forward direction in a head-on wind condition also. The net result of the nose vane assembly 18, the forward vane assembly 20, the roof vane assembly 22 and the corner vane assembly 24 is to reduce the air drag forces on the tractor-trailer truck 12 by turning the air currents so the air will flow around the truck cab 26 and over the trailer 28 in such a way to reduce the aerodynamic drag of the vehicles.

The nose vane assembly 18 is shown on the tractor vehicle in FIGS. 1, 3 and 13 and it is shown in detail in FIG. 2. Preferably the nose vane assembly consists of two, 2, similar sets of vane structures mountable on the front surface 30 of the tractor cab 26 with one set on each side thereof as shown. As a practical matter it has been found necessary to use the two sets of nose vanes due to curvature and other specific shapes of various truck cabs in the front surface thereof. Some tractor cabs are flat across the front surface 30 while others are curved or have several inclined portions. Preferably the nose vane assembly 18 is mounted immediately above the radiator 46 and extends generally upward and forwardly therefrom so the vanes terminate in the space adjacent to the lower edge of the windshield, 36.

The general function of the nose vane assembly 18 is to turn a current of air which would strike the forward surface of the cab so as to direct it upward on the forward surface over the windshield area and in the direction of the forward vane assembly 20.

FIG. 2 shows in detail an end view of the nose vane assembly attached to a portion of the forward portion of the cab indicated at 48. As shown the nose vane assembly 18 has three, vanes 50, 52 and 54 with the lowermost vane 54 supported at a mount 56. The vanes 50, 52 and 54 are connected by elongated members 58 and 60 which are pivotably attached to the ends of the vanes. Vanes 50, 52, and 54 are attached to the bar members 58 and 60 in an equal distance relationship as shown. An upper mount member 62 is attached to the cabs forward body member 48 and supports an adjusting bar member 64 which is attachable to the support member 60 to fix the relative position of the vanes 50, 52 and 54 to the cab 26. The mounts 56 and 62 as shown are attached to the cab forward body member 48 by bolts to illustrate one manner in which the nose vane assembly 18 can be attached to the truck cab. As shown, the nose vane assembly 18 is provided with three, vane members, however, it is to be understood that the nose vane assembly can have a greater number of vane members or a fewer number of vane members than the three shown vane members. In practice it may be necessary to use a larger number of vane members or a smaller number of vane members depending upon the aerodynamics of the specific tractor on which the nose vane assembly 18 is used.

The specific structural arrangement of the vanes 50, 52, 54 and their support on the mount 56 in the spaced relation by the connecting support members 58 and 60 is an important feature of the nose vane assembly 18. The connected relationship of the nose vane assembly 18 is the same for the roof top vane assembly 22. The vanes 50, 52 and 54 are pivotally attached to the support members 58 and 60 as shown so the pivot points of the vanes are in a parallelogram relationship. The lower most vane 54 remains in a stationary position relative to the mount 56 and relative to the tractor cab 26 while the vanes 50 and 52 can be moved relative to the stationary vane 54. Pivoting the vanes controls the velocity of the air flow exiting the vane assembly and consequently will control the velocity of the air current moving upward on the cab's forward surface 30. In the position shown in FIG. 2 a certain amount of air will enter the spaces between vanes. Pivoting the vanes to a lower position relative to the mounts 56 will reduce the exposed frontal area of the vane assembly and particularly the frontal area in which air can pass into the vane assembly 18; at the same time this will increase the spacing of the trailing edge portions of the vanes with the overall result being to decrease the velocity of the air current exiting the vane assembly 18. The vane assembly 18 can be positioned with the vanes uniformly spaced so as to turn the oncoming air current while maintaining a substantially constant velocity. A pivoting vane assembly 18 shown in FIG. 2 will increase the velocity of an air current passing between them relative to the oncoming air velocity. The adjusting bar member 64 is shown with apertures for alternate angular positioning of the vane assembly 18. It is to be noted that a specific angular placement of the nose vane assembly 18 relative to the tractor cab must be adjustable in order to obtain an optimum result and the specific angular position of the nose vane assembly 18 will vary according to the aerodynamics of the specific tractor cab, prevailing wind conditions and prevailing atmospheric conditions. The nose vane assembly 18 as shown in FIG. 2 is fitted with vanes having the general cross-sectional shape of a low speed airfoil; however, it is to be understood that the vanes can be constructed having a different aerodynamic shapes. For example vanes of the nose vane assembly 18 can be constructed into the shapes illustrated in FIG. 5 and FIG. 7.

FIG. 6 illustrates the spaced relationship of a pair of vanes which represent a typical pair of vanes for the several multi-vane assemblies of the drag reducing vane assembly of this invention. The vanes are shown in their cross-sectional shape in FIG. 6 have arrows thereon indicating the geometry of the vanes in their mounted space relation. The vanes are indicated at 70 and 72 and are mounted with a supporting structure at the pivot points 73, 74, 75 and 76. The vanes 70 and 72 are supported so the vanes form sides of a parallelogram structure as previously described. The vanes are mounted to move at the pivot points 73, 74, 75 and 76 and in doing so change the relative spacing between the vanes 70 and 72 at their leading edge portions and at their trailer edge portions. The distance between the vanes 70 and 72 at the leading edge portion is indicated by the arrows 78, and the distance between the trailing edge portions at 80. The portion between the vanes is preferably nearly uniformly sized from the leading edge portion of the vanes to the trailing edge portion of the vanes and is indicated at 82. As the vanes assembly is moved from a raised position to a lowered position the space between the leading edge portions of the vanes, indicated by the arrow 78, will decrease while the distance between the trailing edge portions of the vane, indicated at 80, will increase. In reverse, as the vane assembly is moved from a lowered position to a raised position the distance 78 between the leading edge portion of the vane will increase while the distance 80 between the trailing edge portions of the vane will decrease. This changing of the vanes relative position is obvious upon studying the structure of FIGS. 2, 6 and 14. In use as air moving into the vane assembly it can be decreased or increased in velocity depending upon the position of the vanes. In FIG. 6 an arrow adjacent to the leading edge portions of the vanes indicates the general direction of air entering the vanes and another arrow adjacent to the trailing edge portions of the vanes indicate the direction of air leaving the vane assembly. For the vanes shown in FIG. 6 the resultant turning angle for the air current is ninety degrees and it is indicated in the arrows 84 and 86.

The specific shape of the vanes can be varied according to the angle which the air current is to be turned. FIG. 7 shows an airfoil shape and solid lines and several other airfoil shapes in dashed lines. The airfoil shapes shown in FIGS. 5 and 7 can be used with the vane assemblies of this invention without departing from the scope of the invention. In FIG. 7 the airfoil is shown in solid lines and is indicated at 88 and is constructed to turn an air current approximately ninety degrees and the other airfoils indicated in dashed lines at 89, 90 and 91 are shaped so as to turn air current and angle lesser than 90°. The airfoil shape 88 is designed to turn air current ninety degrees and it has a portion of its trailing edge portion 92 constructed so that the tip end of the trailing edge portion 92 is at an angle less than ninety degrees relative to the oncoming air flow. The distance indicated at 94 is the distance from the turned air flow that the trailing edge of the vane 88 is spaced. The distance 94 is small relative to the size of the vane yet has the result of turning the air current the desired angle by compensating for the tendency of the air flow to straighten once it passes the trailing edge of the vane. The arrows 96 indicate the direction of the oncoming air and the arrow 98 indicates the angle which the air flow is turned, in case of airfoil 88 in FIG. 7 such is 90°. The mean line of the airfoil shaped vane 88 has the ends thereof at an angle less than the desired turning angle for the air current. For the vanes showing in dashed lines, 89, 90 and 91, in FIG. 7, the respective trailing edge portions thereof can also be constructed similar to the described vane 88 to compensate for the straightening tendency.

FIG. 5 shows in detail the cross-sectional shape a double pointed vane indicated at 100. The vane 100 has a pointed leaving edge portion 102 and a pointed trailing edge portion 104. The vane 100 will function generally similar to the vanes that have the rounded leading edge portions as shown in FIGS. 6 and 7. In some cases it may be advantageous to use a vane with the double pointed cross-sectional shape. It is obvious that an airflow moving in the direction of the arrow 106 will be turned by the vane 100 to move in the direction of the arrow 108. Additionally, is obvious that the vane 100 can be constructed with the leading edge portion 102 and the trailing edge portion 104 differently angularly oriented than shown for the turning of the air current a specific amount relative to its original direction of travel. The vane 100 is included to disclose another shape of vane which can be used with the drag reducing vane assembly of this invention. In the several vane shapes shown and described herein they are generally constructed and adapted to turn a current of air an angle between zero and ninety degrees relative to its original direction of travel. The specific angle which the vanes must turn an air current will depend on the specific use of the individual vanes. In practice vane structures have been constructed in several different turning angles with a standard airfoil shape. A Clark-Y airfoil shape in its basic thickness and camber has been successfully used as a low-speed airfoil profile for a vane.

The forward vane assembly 20 is attached to the upper forward corner portion of the tractor cab 26 and is shown in detail in FIGS. 1, 3, 4 and 13. The forward vane assembly 20 includes a vane member 108 and support members 110 and 112 mounting it on the upper forward portion of the tractor cab 26. The vane 108 extends completely across the cab 26 terminating at or near the sides of the cab. The leading edge portion 114 of vane 108 is spaced from the forward surface of the cab 20 and terminates at its lowest point in the vicinity of the top of the windshield 36. The forward vane's trailing edge portion 116 terminates above the roof 34 of the cab 26 at a distance thereabove the roof. Preferably the forward vane 108 is curved around the forward corner portion 32 of the tractor cab 26 as shown in the drawings. The forward vane 108 is spaced away from the cab's corner portion 32 so as to turn and direct the upwardly moving air current on the cab's forward surface 30 and turn so it will pass over the cab's roof 34 and in a rearwardly direction. As shown in FIG. 13 the forward vane 108 can be constructed in a swept-back configuration so as to conform with the shape of the cab's corner portion 32 in the event the cab is swept back on its forward surface. Some styles of tractor cabs currently in use have the windshield portion thereof and the adjoining cab portions flat or straight across on the front thereof whereas others use a swept-back configuration as shown in FIG. 13.

The forward vane member 108 as shown provides an air current turning device and a sunshade or sun visor for the windshield 36 of the tractor. The mounts 110 and 112 are secured to the tractor cab 26 and to the vane 108 to rigidly attach it to the structure of the cab. Preferably in the general position shown in FIG. 4.

The drawings show the forward vane assembly 20 having a single vane 108 mounted with the tractor cab's forward portion 32. It is to be understood that the forward vane assembly can be constructed with multiple vanes and in a stacked relation similar to the stacked relation of the vanes of the nose vane assembly 18 and the roof top vane assemblies 22 and 14. In a multiple vane configuration the lowermost vane thereof could be supported somewhat as shown in FIG. 4 with the other vane or vanes pivotally attached to it and extending upward. In practice it has been found that multiple vane structures mounted as described for the forward vane assembly 20 function to reduce the drag forces on a tractor-trailer vehicle, such is described in the hereinafter included example.

Figure 14:
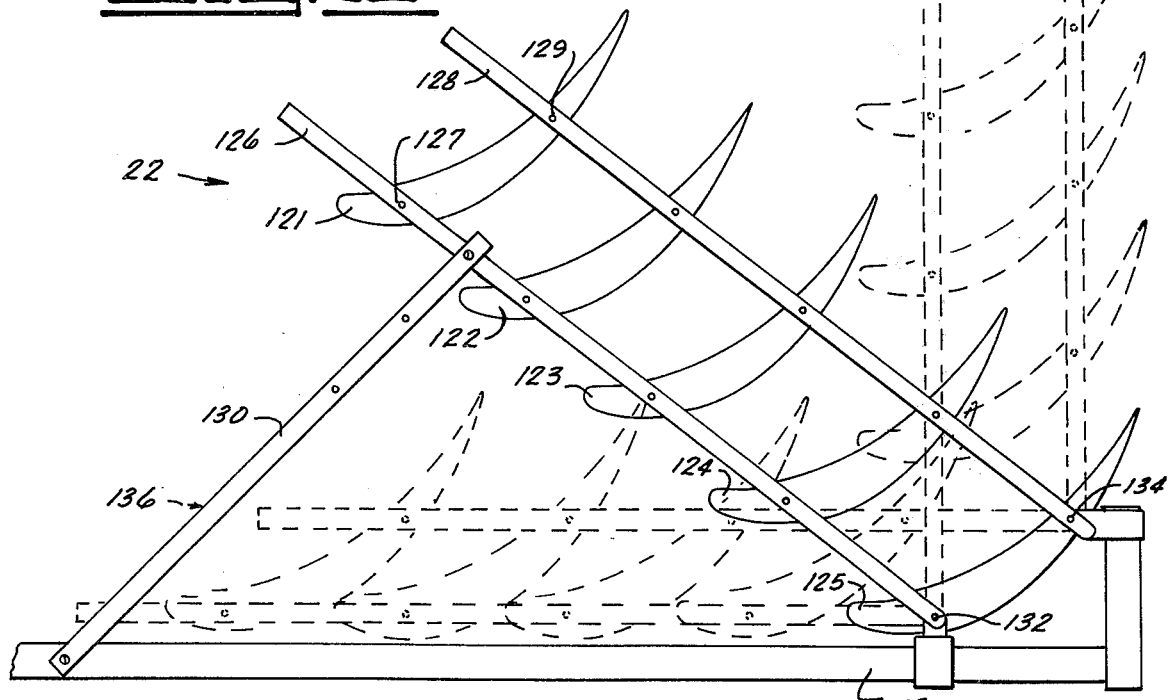
FIG. 14 is an enlarged side elevation view of the roof and top vane assembly for the tractor-trailer truck shown in FIG. 1, with the vanes shown in solid lines in an intermediate position and in dashed lines in a lowered position and upright position.

The roof top vane assembly 20 is shown in FIGS. 1, 3, 13 and 14. The roof top vane assembly is preferably attached to the roof 34 of a tractor cab 26 on the rear portion thereof. FIG. 14 shows the roof top vane assembly 22 alone and shows in dashed lines two alternate positions of its vanes. The roof top vane assembly has a mount shown on each end of the vanes with the mount being attachable to the roof. The roof top vane assembly 22 includes a mount 120, a plurality of vanes indicated at 121, 122, 123, 124 and 125 with the lowermost vane 125 supported at the mount 120 and the other vanes pivotally attached by support members 126 and 128 as shown. A brace member 130 connects the mount 120 and the support member 126 for supporting the vanes in a fixed position. The pivotally attached relation of the vanes is the same as hereinbefore in conjunction with the nose vane assembly 18. The lowermost vane 125 is rigidly attached to the mount 120 and the support members 126 and 128 extend from it rotating about their pivotal points of attachement which are indicated at 132 and 134. The vanes 121, 122, 123 and 124 are maintained in a pivotable parallelogram relationship. The brace member 130 supports the vanes in a fixed position relative to the mount 120 and in turn relative to the tractor cab 26. The brace member 130 is shown with a plurality of holes therein for securing it with the support member 126. The brace structure shown indicates one manner in which the vanes can be held in a rigid position. It is to be understood that brace structures other than a brace member 130 can be used to support the vanes. Another manner of supporting the vane assembly is to support the same in adjustable relationship by using an air operated motor or air operated actuator and a linkage mechanism connected to the support members 126 and 128 to provide for an easy and remote adjustment of the angular relationship between the vanes and the tractor cab 26.

The lower portion of FIG. 14 shows in dashed lines the roof top vanes in a full lowered position, generally indicated at 136, with the vanes as close as possible to the mount 120 and the tractor cab roof. In the full lowered position 136 the roof top vane assembly 22 will have substantially no effect on aerodynamics the tractor as driven. Depending upon the specific size and shape of the vanes used with the roof top vane assembly they may or may not touch each other when in this lowered position. Placing the roof top vane assembly in the lowered position may be necessary when driving the tractor alone into a garage or the like so it will clear obstacles. The roof top vane assembly is shown in dashed lines in FIG. 14 in a nearly vertical upright position generally indicated at 138.

Adjusting the position of the roof top vane assembly 22 is necessary so the vanes will properly direct the air current to pass just over the leading edge portion of the top of the trailer to obtain an optimum drag reduction. Proper positioning of the roof top vane assembly 22 depends upon the spacing between the rear of the vane assembly and the front of the trailer and the height different between the bottom of the vane assembly and the top of the trailer. Obviously, it is an advantage to have the vanes assembly adjustable from inside the cab such as via remote control so it can quickly and easily be put in the proper position when a tractor is connected with different trailers which may vary in height and distance from the rear of the tractor cab. It is to be noted that the roof top vane assembly 22 can be used with vanes having a different cross-sectional shape than those shown in FIG. 14. For example the vanes of the roof top vane assembly 22 can be constructed in any of the several vane shapes shown in FIGS. 5 and 7 or other shapes as desired. In practice the roof top vane assembly 22 has proven to be the most effective drag reducing device of the several cooperating drag reducing vane structures of this invention when used with a vane having the general airfoil cross-sectional shape as shown in FIG. 14.

Figure 15:
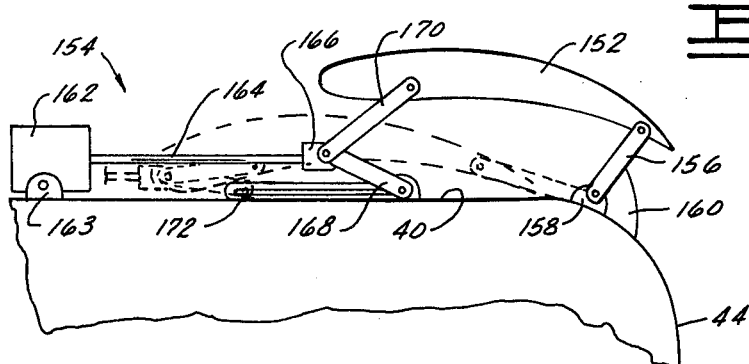
FIG. 15 is an enlarged top plan view of the corner portion of the trailer shown in FIG. 13, illustrating the trailer vane assembly, showing in solid lines the vanes in an extended position, and in dashed lines the vane in a lowered storage position.

The corner vane assembly 24 is shown in FIGS. 1, 3, 13 and 15 in its mounted relation with the trailer 28 of the tractor-trailer rig. 12. The corner vane assembly or trailer vane assembly 24 includes a pair of vane members 150 and 152 and an apparatus to support same on the forward corner portions of the trailer 28 so that the vanes can be moved between a retracted storage position against the trailer and an extended position spaced from the trailer. The FIG. 15 shows in detail the vane support and moving apparatus generally indicatd at 154 and a vane 152 with the vane in the raised position and solid lines and in the lowered storage position in dashed lines. It is to be noted that in the extended position the vanes 150 and 152 do not extend past the sides 42 and 44 of the trailer 28. Typically, trailers such as the trailer 28 are constructed to the maximum allowable legal width and thus the vanes 150 and 151 of the trailer vane assembly 24 can not extend outward pass the sides of the trailer.

The trailer vanes supporting apparatus 154 is preferably a linkage mechanism remotely controllable to extend and retract the trailer vanes 150 and 152 and independently and adjust the angle of attack of the individual vanes relatively forward the surface 49 of the trailer. The trailer vane 152 and moving apparatus 154 shown in FIG. 15 is represented by both of the trailer vane assemblies. The trailer vane moving apparatus 154 has a link member 156 pivotally attached to its trailing edge portion which is pivotally supported by mount 158 on the trailers forward surface 40. A stop member 160 extends from the corner portion of the trailer and contacts the link 156 so as to limit the outward movement vane 152. A servo 162 is supported on the trailers forward surface 49 by pivotal attachment to a mount 163 and is connected to the leading edge portion of the vane 152 by an actuator arm 164, a wobble joint 166, and a pair of link members 168 and 170. The wobble joint attachment of the vanes leading edge portion has a link 170 pivotally attached to the joint 166 and pivotally attached to the leading edge portion of the vane 152, and it has the other link 168 pivotally attached to the joint 166 and slideably supported in a slotted mount member 172 attached to the trailers forward surface 40. Action of the vane moving apparatus 154 moves the trailer vane from the position shown in the dashed lines of FIG. 15 to the general position shown in solid lines in the same figure. The slotted mount member 172 allows the leading edge link 168 to move relative to the point of attachment of the trailing edge vane 156 thereby pivoting the trailing edge link 156 and moving the vane 152 in the direction of the center portion of the trailer. When the trailer vane 152 is in the general position shown in solid lines in FIGS. 15 the height of the leading edge portion and the angle of attach can be adjusted relative to the trailers forward surface by selectively actuating the servo 162 to further extend or retract the actuator arm 146 thereby spreading or narrowing the extreme ends of the links 168 and 170. When the tractor-trailer vehicle is in forward motion air pressure will cause the vanes 152 and 150 to be held in the general position shown in FIG. 15 as air passes around them. When the trailer vanes are pulled down into the storage position they will not substantially effect air flow around the corners of the trailer. When the trailer vanes are in the extended position they cause the air flowing outward on the trailer's forward surface 40 to be turned around the corners of the trailer thereby providing a laterial stabilizing influence on the trailer. The trailer vane assembly 24 provides a way to reduce the turbulance in the air alongside the corner portions of the trailer. Additionally as the air flows past the trailer vane assembly 24 the orientation of the vanes will produce a forwardly and outwardly directed force pulling on the trailer 28 aiding in laterial stability. Use of the remotely controlled servos 162 enable the trailer vane assembly 24 to be adjusted and set from a remote location such as in the cab of the tractor. The trailer vane assembly 24 or corner vane assembly is particularly useful when the tractor-trailer rig 12 is moving in cross-wind condition because at such time a great amount of turbulance is created on the leeward side of the trailer and the trailer vane assembly 24 causes air to be turned sharply around the corners of the trailer.

In use the drag reducing vane assembly 10 of this embodiment, of this invention will substantially reduce the air drag forces on a tractor-trailer rig when operating at highway speeds. The several individual vane assemblies of the entire drag reducing vane assembly 10 cooperatively function to direct the flow of air over and around the tractor and the trailer. The nose vane assembly 18 functions to direct a high velocity air flow upward on the forward surface 30 of the tractor cab 26 over the windshield thereof to the forward vane assembly 20. An additional side effect of the nose vane assembly 18 is that by virtue of the high velocity stream of air over the cabs forward surface 30 and windshield 36 it will produce an air cushion over the windshield and prevent to some extent bugs and the like from contacting the windshield and may aid in the prevention or formation of ice, in the windshield area. The forward vane assembly 20 is adapted to turn the upwardly moving high velocity air current on the front surface on the tractor cab and direct it rearwardly over the roof 34 of the cab in the direction of the roof top vane assembly 22. The forward vane assembly 20 as shown has only one vane member; however, it is to be understood that such can be constructed with multiple vanes and constructed in an adjustable manner similar to the nose vane assembly 18 in the roof top vane assemblies 14 and 22. An additional side effect of the forward vane assembly 20 is that it will provide some degree of sun shading for the windshield 36 and thus act as a sun visor. The roof top vane assembly 22 is adapted to receive the rearwardly moving air stream from the forward vane assembly 20 and air from the space thereabove which is also moving rearwardly relative to the tractor and to direct it upwardly and rearwardly over the upper forward portion of the trailer 28. The roof top vane assembly 22 is adjustable in its angular relation on the roof 34 of the tractor-cab 26 so it can be positioned for an optimum reduction in the air drag forces on the tractor-trailer truck or rig 12. These specific setting of the roof top vane assembly depends upon the physical height relationship between the cab roof 34 and the trailer top 38 and the spacing of the trailers forward surface 40 behind the vane assembly 22. The trailer or corner vane assembly 24 is adapted to receive air striking the surface of 40 of the trailer 28 and direct it around the forward corners of the trailer turning to the side of the trailer. Air strikes the forward surface 40 of the trailer 28 by passing around the sides of the tractor cab 26 when the truck 12 is moving in a headwind condition. Air also passes inward between the rear of the tractor cab 26 and the forward portion of the trailer 28 when the tractor-trailer truck 12 is moving in a cross-wind condition.

EXAMPLE

The following is excerpts of wind tunnel tests and performance analysis of the tractor mounted drag reducing vane assemblies of the drag reducing vane assembly 10 of this invention. The wind tunnel tests and performance analysis were performed on a scale model of a tractor-trailer vehicle having the nose vane assembly 18, the forward vane assembly 20 and the roof top vane assembly 22 with each of the vane assemblies tested individually and cooperatively. All tests were conducted at the 7 foot by 10 foot Walter Beech Memorial Wind Tunnel at Wichita State University, Wichita, Kans.

The wind tunnel tests were carried out on a one-eighth scale model of a tractor-trailer rig. The particular model was scaled from a commercially available tractor, a WHITE FREIGHTLINER having a 75 inch deep cab. The trailer model was scaled from a commercially available trailer, namely a trailer produced by the FRUEHAF CORPORATION and being 40 feet long and 13 feet 6 inches high. The model was mounted above a special ground plate used previously for scale automotive testing. The model resembles closely the tractor-trailer rig shown in FIGS. 1, 3 and 13 of the drawings with the exception that the trailer of the model did not have the trailer vane assembly 24. The model wheels were provided with a 0.25 inch gap above the ground plane to avoid the contact therewith and eliminate dynamic tares.

Preliminary tests were conducted with a special tuft board mounted on the model center line to study the air flow around the vehicle, at a dynamic pressure of 5 pounds per square foot the force measurements were conducted at a dynamic pressure of 25 pounds per square foot which corresponds to a speed of 103 miles per hour and a Reynolds Number of 4,900,000, based upon the vehicle length. Preliminary force tests were run at dynamic pressures of 25, 45 and 60 pounds per square foot to evaluate effects of Reynolds Number on drag coefficient. Force measurements were also made at yaw conditions simulating crosswinds at 40°.

The tuft board was used to find the best angular setting and the best number of vanes for each of the vane assemblies. The tuft board was a planar member having a plurality of rows and columns of tufts attached thereto and bolted vertically on top of the trailer extending over the tractor cab. The tractor and trailer had a plurality of rows and columns of tufts attached to their sides and top. Use of the tufts permitted a rapid determination of the best setting for each set of vanes. The best setting is the setting which will produce the minimum number of blurred or disturbed tufts on the model while running in the wind tunnel. The disturbed tufts indicate regions of flow separation which will produce drag. The nose vane assembly was tested at two separate settings in conjunction with the roof top vane assembly. From the two tests run there was no observable improvement in the flow pattern over the tuft board on top of the trailer or around the complete vehicle. The effect of changing the number of vanes and the vane setting for the roof top vane assembly was clearly evident and a number of tests were run.

The best number of vanes were selected at six vanes and the best tilt angle was between 44° and 58° relative to the tractor cab roof.

Force tests were made on the described model in the wind tunnel using the wind tunnel's main balance system to obtain data for calculating drag forces, side forces and yawing moments. Preliminary tests were made on the tractor-trailer model without any of the vane assemblies to determine the effect of Reynolds Number on the drag coefficient. Ordinarily, for bluff body shapes such as the tractor-trailer truck model the drag coefficient is independent of the Reynolds Number. The tests results indicated only a slight variation in the drag coefficient variation with Reynolds Number. All subsequent testing was carried out at a constant Reynolds Number, by setting the dynamic pressure of the wind tunnel at 25 pounds per square foot. The drag coefficient of the tractor-trailer model alone without vane assemblies was found to be 1.0674. At this point it is to be noted that the drag coefficient for similar shaped objects can be expected to fall within the range of 0.8 to 1.3 it is disclosed in a reference text; Pope, A., and Harper, J. J.; Low Speed Wind Tunnel Testing, John Wiley, 1966. The drag coefficient for the tractor-trailer model in the basic vaneless configuration falls within the range of the quoted values. The result of the drag force tests are summarized in the following table which lists the configuration of the tractor-trailer-vehicle and the vanes thereon, the coefficient of drag and the percentage drag change relative to the basic tractor-trailer model.

COMPARISON OF DRAG CHARACTERISTICS IN FORCE TESTS

| CONFIGURATION | AVERAGE DRAG COEFFICIENT | % CHANGE IN THE DRAG |
|---|---|---|
| Basic model | 1.0674 | (reference) |
| 6 roof vanes at 43.5° | 97.89 | −8.29 |
| 6 roof vanes at 48.3° | .9484 | −11.14 |
| 6 roof vanes at 54.4° | .9475 | −11.23 |
| 6 roof vanes at 58° | .9563 | −10.40 |

Force test with 6 roof vanes at 54.4° and the following in addition thereto:

| | | |
|---|---|---|
| 4 nose vanes at 22.2° | .9490 | −11.09 |
| 4 nose vanes at 15° | 1.0302 | −3.48 |
| 4 nose vanes at 22° | 1.0332 | −3.2 |
| 4 nose vanes at 34.2° | 1.0405 | −2.52 |

Force test with 6 roof vanes at 54.4°, plus 4 nose vanes at 22.2°, and in addition thereto:

| | | |
|---|---|---|
| 3 fwd vanes at 50.0° | 1.0083 | −5.53 |

Force test with 6 roof vanes at 54.4°, plus 4 nose vanes at 22.2°, and in addition thereto:

| | | |
|---|---|---|
| 2 fwd. vanes at 50.0° | .9605 | −10.01 |

Force test with 6 roof vanes at 54.4°, plus 4 nose vanes at 22.2, and in addition thereto:

| | | |
|---|---|---|
| 1 fwd. vane at 50.0° | .9405 | −11.88 |

From the above table it is obvious that the greatest drag reduction and consequently the best configuration is the last listed set in the table consisting of six roof top vanes, four nose vanes and a single forward vane. It is to be noted that the six roof top vanes alone provide a substantial reduction in the drag coefficient, that being 11.23 percent.

Figure 16:
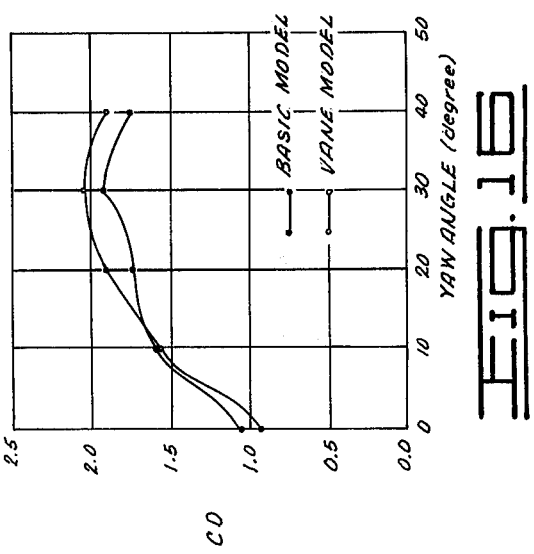
FIG. 16 is a graph of Drag Coefficient versus Tow Angle in degrees.

Tests were conducted with side winds to simulate the cross-wind conditions by rotating the model and the wind tunnel to the right or left of the center line of the wind tunnel. Measured forces in the wind axis or were resolved into a body axis system to evaluate the actual tractive force on the tractor-trailer model. The side wind tests were conducted on the tractor-trailer model having the roof top vane assembly only with a vane setting at 54.5° as that was the configuration which produced the greatest change in drag coefficient for a single set of vanes. FIG. 16 shows in graphical form the results of the tests.

FIG. 16 reveals some reduction in drag coefficient for small yaw angles and large increases in the drag coefficient or larger yaw angles. Obviously the drag coefficient and the drag force increase greatly as the side wind component of a cross-wind increases. This increase in drag coefficient is a result of the increased dynamic pressure due to the side wind velocity component and a greater portion of the trailer's front surface being exposed to the high speed air flow. It is anticipated that the trailer vane assembly 24 will reduce the force coefficient in the side wind condition; however, such has not been proven by model tests.

Fuel savings due to the reduction of air drag forces on the tractor-trailer model tests were analyzed. In order to determine the fuel consumption savings to be realized by the reduction in aerodynamic drag forces, it is necessary to evaluate the vehicles total preformance. The total power of the vehicle is composed of three parts; rolling friction (tires); drive train losses (gears, bearings, etc.); and air drag. Each of these parts must be individually analyzed in order to determine an expected percentage of fuel savings resulting from the air drag reduction. The vehicle analysis was made with the aid of information contained in an article entitled "Mechanics of Vehicles" by Jaroslav J. Jaborek, published in *Machine Design Magazine*, 1957.

In regard to the rolling friction the rolling resistance force (Rr) is related to the weight (W) through the coefficient of the rolling friction (f);
   Rr = f w (pounds).
The rolling friction coefficient, (f), depends upon the vehicle's speed and tire pressure as shown immediately below:

$$f = fo + (3.24)(fs)\left[\frac{V}{100}\right]^{2.5}$$

where:
   fo = 0.0083
   fs = 0.0020
and V is the vehicle's speed in miles per hour. The factors fo and fs are for hard surface roadways and tire pressures over 50 pounds per square inch.

The power required to overcome rolling friction is given by the equation:

$$\text{H.P. roll} = \frac{Rr\ V}{375}$$

Substituting the rolling resistance force in the above equation gives:

$$\text{H.P. roll} = \frac{f\ W\ V}{375}$$

Using equations for rolling resistance force and the equation for the power required to overcome rolling friction the power required to overcome a rolling resistance may be calculated for any weight and vehicle speed desired.

The drive train losses include the friction effects of the transmission, differential, and bearings. Typically, the drive train losses total about 10 percent of the power transmitted for tractor-trailer vehicles. To account for the drive train losses 10 percent is added to the power required to overcome the rolling resistance and the air drag as represented in the following equation:
   H.P. total = 1.10 (H.P. roll+H.P. air drag)

The aerodynamic drag force is the force required to overcome the effects of air resistance. The aerodynamic drag force is:
   DA = q CD A (lb.)
where:
   q = air dynamic pressure, pounds per square foot $$q = \frac{V^2}{391} \text{ (for standard air density)}$$

CD = aerodynamic drag coefficient
   A = reference area, in square feet

The aerodynamic drag coefficient value depends on the shape of the object and is determined from the wind tunnel tests of the model truck. The reference area is the frontal area of the truck, including the area of the front surface of the tractor, the area of the wheels below the cab, and the portion of the trailer extending above the tractor cab. The full scale vehicle, namely the WHITE FREIGHTLINER has a frontal area of 78.6 square feet.

The power required to overcome the aerodynamic drag is given by the equation:

$$\text{H.P. air drag} = \frac{DA\ V}{375}$$

Figure 17:
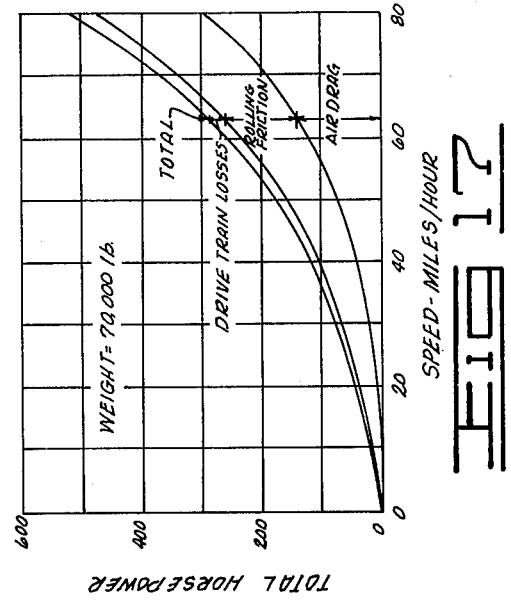
FIG. 17 is a graph of Total Power versus Speed in miles per hour.
Figure 18:
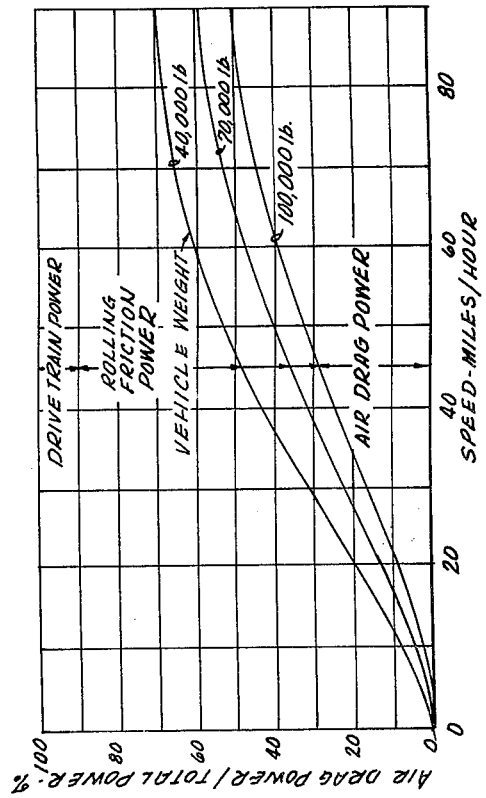
FIG. 18 is a graph of Air Drag Power per Total Power versus Speed in miles per hour.

With the immediately above equation the total power required can be evaluated by use of the above equation for total horsepower, (H.P. total), FIG. 17 shows total horsepower in relation to speed in miles per hour for a gross vehicle weight of 70,000 pounds as calculated from the immediately above equations. The curves of FIG. 17 show the drive train losses are a constant percentage while the aerodynamic and rolling resistance forces depend upon speed and increase greatly at higher speed. It is also obvious that at the higher speeds namely, approximately 60 miles per hour and above the horsepower required for the air drag is the major contributor to the total horsepower required. FIG. 18 shows the same information displayed in FIG. 17 but with the percent of air drag power to total power plotted versus speed in miles per hour for vehicles of 40,000 pounds, 70,000 pounds and 100,000 pounds. FIG. 18 illustrates the percentage contribution of each type of power as a function of speed. FIG. 18 shows obviously that drive train power is a constant, for lower speeds rolling friction power is predominate and for higher speeds air drag power is predominate.

Fuel usage calculations were made to determine the specific percentage of fuel mileage improvement and the cost reduction for the drag reducing vane assembly on the tractor-trailer vehicle. The fuel mileage of the vehicle is calculated by considering the speed, the engine brake specific fuel consumption and the fuel specific weight as follows:

$$\text{M.P.G. (miles/gallon)} = \frac{V}{(Bsfc)(\text{H.P.})}(wf)$$

Where:
   V = speed in miles per hour
   Bsfc = brake specific fuel consumption, lb/H.P. -hr.
   wf = fuel specific weight, lb/gallon It is well known that fuel mileage figures vary widely with the type of vehicle, the condition of the vehicle and the type of operation of the vehicle. Typically, tractor-trailer vehicles have a fuel mileage ranging from 3 to 6 miles per gallon in over-the-road use. Rather than calculate the specific fuel mileage values a percentage improvement in fuel mileage due to the air drag reduction is calculated first. The change in fuel mileage due to drag reduction is given by the equation:

$$\frac{\text{Percent Fuel}}{\text{Mileage Savings}} = \frac{\text{Percent Drag}}{\text{Reduction}} \times \frac{\text{Air Drag H.P.}}{\text{Total H.P.}}$$

Figure 19:
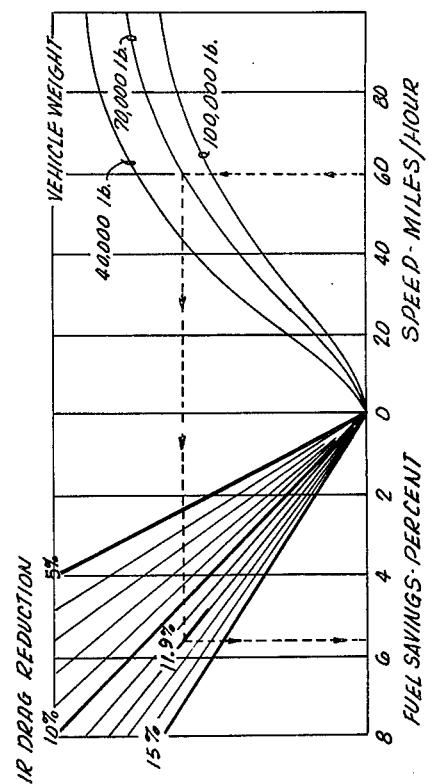
FIG. 19 is a graph of Fuel Savings as a percentage versus Speed in miles per hour for Vehicle Weight and Air Drag Reduction in percent.

The above equation is derived based upon a percent fuel mileage savings of less than 10 percent and a constant engine brake specific fuel consumption (bsfc). The Air Drag H.P./Total H.P. term depends on the vehicles speed and weight, and is determined from FIG. 17. The percentage drag reduction term comes directly from the wind tunnel tests, in this instance the above table. The results of this anaylsis are combined and shown in graphical form in FIG. 19 which gives the fuel savings as a percentage versus the vehicles speed, the vehicle weight, and the percent air drag reduction. Use of the graph of FIG. 19 is best illustrated by refering to the test data and in particular the tested model of the truck having six roof top vanes at 54.4°, four forward vanes at 22.5° and one visor vane at 50° which has a −11.88 percent change in drag. Assuming a vehicles speed of 60 miles per hour, and a vehicle weight of 70,000 pounds and rounding off the percent change in drag figure to 11.9 percent, use of FIG. 19 shows a fuel savings of 5.6 percent.

The cost savings is a direct function of the percentage improvement in miles per gallon, the miles driven and the fuel costs as expressed in the following equation:

$$\text{Cost savings} = \frac{(\% \text{ M.P.G. Improvement})}{(100)} \times \frac{(\text{Annual Miles})}{(\text{M.P.G.})} \times (\text{Fuel Cost Per Gallon})$$

Use of this cost savings equation is illustrated by the above equation in an example using the following assumptions:

Air Drag Improvement = −11.9%
Weight = 70,000 lb.
Speed = 60 mph
Fuel Mileage = 4.8 mpg
Fuel Cost = $.30/gallon
Annual Mileage O = 120,000 miles $$\text{Cost saving} = \frac{(5.6)}{(100)} \frac{(120,000)}{(4.8)}(\$.30)$$

= $442/year

In a second embodiment, (2), of the air current turning and drag reducing vane assembly of this invention such includes a roof top vane assembly, generally indicated at 14, adapted to be used in conjunction with a stationwagon type vehicle and a trailer, generally indicated at 16. The drag reducing vane assembly of this embodiment, (2), of this invention is shown in the drawings in FIGS. 8, 9, 11 and 12. The second embodiment drag reducing vane assembly 14 is mounted with the roof of a stationwagon or a similar vehicle on the rear portion thereof so when it is in forward motion it will turn the air current passing rearwardly over the roof to direct it in an upward and rearward direction to pass over the top of a trailer attached behind the stationwagon like vehicle. The drag reducing vane assembly 14 functions similar to the previously described roof top vane assembly and has a similar effect on reducing the air drag forces on the vehicles when in forward motion.

FIG. 8 and FIG. 9 show the second embodiment roof top vane assembly with the stationwagon like vehicle-trailer combination 16. The second embodiment roof top vane assembly 14 is mounted on the upper portion of the rear of the roof of a stationwagon vehicle 182. The travel trailer vehicle indicated at 184 and is depicted as a travel trailer for example purposes as they are generally taller than towing vehicles such as automobiles, stationwagons, vans and the like. The drag reducing vane assembly of this embodiment (2) can be used with any trailer which is taller than the towing vehicle. The vane assembly 14 is attached to the roof of the stationwagon vehicle by mounting it to the gutter portion of the roof structure and a removable fashion. The construction of the second embodiment vane assembly 14 is such that position of the vane thereof can be adjusted relative to the horizontal for either positioning the vane assembly down in a storage position or up in a raised position. The vane assembly 14 is adjustable so as to direct the air current over the trailer and compensate for trailers of different heights.

FIGS. 10, 11, and 12 show in detail the structure of the second embodiment roof top vane assembly 14 in a mounted relation on a roof segment. The second embodiment vane assembly 14 includes a mount 186 for attaching it to a vehicle and a plurality of elongated vanes generally indicated at 188 extending substantially across the roof of the vehicle and being transverse to an oncoming rearwardly moving air flow. The mount 186 is a frame like structure having transverse members 190 and 192 connected to side members 194 and 196. The frame transverse members 190 and 192 have roof supports 198 extending downward therefrom as shown for mounting with the roofs' gutter 200. The lower end of the roof support has a gutter clip member 202 secured thereto by a bolt thereby making the roof supports removably attachable to the roof gutter 200. The vanes 188 are supported in a spaced relation by support members 204 and 206 which are pivotally mounted with upright plates 208 and 210 that extend upward from the side members 194 and 196 on the rear of the mount assembly 186. Brace members 212 and 214 join the vane support members 204 and 206 to support the vanes 188 in an upright position. The plate members of 208 and 210 pivotally mount the support members 204 and 206 at the pivots indicated at 216 and 218. The vane support members 204 and 206 are connected on their upper ends by transverse members 205 and 207 for stability. The vane assembly 14 is shown with three vanes indicated at 220, 222, and 224 with the lowermost vane 220 being supported at the pivotal attachment of the support members of 204 and 206 with the plates 208 and 210. The other vanes 222 and 224 are pivotally attached to the support members 204 and 206 in the spaced relation as shown and are pivoted at their connections with the vane support members 204 and 206 as indicated. The shown spaced relation of the vanes 188 is for the purpose of putting their pivot points in a parrallelogram relationship for reasons described previously in conjunction with the first embodiment (1). Three vanes are shown in the second embodiment vane assembly 180; however, this should be understood that a greater number or a fewer number than the three vanes shown can be used. In practice it has been found that three vanes used with the structure as shown and mounted on the rear of a stationwagon will produce a significant reduction in air drag when pulling a travel-trailer such as a small house-trailer.

The specific vane mount structure 186 shown has the lowermost vane 220 mounted between the upper-right plate members 208 and 210. The plate members 208 and 210 each have a pair of plates mounted rigidly to the side members 194 and 196 with the support members 204 and 206 being therebetween and supported on their lower ends at the pivots points 216 and 218. The lowermost vane 220 extends between the innermost plates and does not pivot when the support members 204 and 206 are raised or lowered. The vanes 220 and 222 and 224 must be mounted generally as shown with a pivot point on their leading edge portion, and another pivot point on their trailing edge portion to maintain them in the proper spaced relationship. As previously described the proper spaced relationship of the vanes 188 will provide for an increased velocity exit air flow when the vanes are in a raised position, generally above 45° relative to the horizontal, and provide for a decrease exiting air flow velocity when the vane support members are in a lower position, generally below 45° relative to the horizontal. The brace members 212 and 214 can be secured to support members 204 and 206 or to a single support member on each end of the vanes 188 by bolts or the like to fix the position thereof. In the alternative, the second embodiment vane assembly 180 can be provided with a servo actuator and the appropriate linkage to provide for remote adjustment and positioning of the vanes 188; however, such is not shown.

FIG. 11 shows the second embodiment assembly 14 and in a raised position similar to the position shown in FIG. 8 and FIG. 9. With the vane assembly 14 in this raised position an air current moving rearwardly over the roof of the towing vehicle 182 will be directed upwardly and rearwardly and so as you pass over the upper forward most corner of the trailer 184. The specific angular orientation of the vanes 188 relative to the horizontal and relative to the roof of the towing vehicle depends upon the relative position of the vane 14 assembly and the corner portion of the trailer.

When the vane assembly 14 is not being used, such as a time when the trailer 184 is not connected with the towing vehicle 182, it can be placed in a lowered storage position as shown in FIG. 12 and in this position will not cause a significant interference with air flow around and over the stationwagon like towing vehicle 182. An additional feature of the second embodiment vane assembly 14 as shown is that it can be completely removed from the towing vehicle by disconnecting mounts 198 from the roof when the stationwagon like towing vehicle 182 is to be used for an extended period without pulling the trailer. It is to be noted that if desired, the second embodiment vane assembly 14 can be permanently mounted with the roof of a stationwagon or like towing vehicle by minor structural changes to the mount assembly 186.

In practice it has been found desirable to position the vane assembly 14 such that the vanes 188 thereof will be in the general position shown in FIG. 11. An angle of about 45° relative to the horizontal has been found satisfactory. With the vanes 188 in the described angular position the air current will be turned as it passes through the vanes with the velocity thereof remaining substantially constant. The specific airfoil shapes of the vanes 188 can be other than those shown in FIG. 11 and can be airfoil shapes as shown and described in FIG. 5, 6 and 7. It is to be understood that the specific airfoil shapes shown with the second embodiment vane assembly 14 are not to restrict of scope of the invention.

In a third embodiment, (3), of the air current turning and drag reducing vane assembly of this invention such as adapted for use with trucks which have the cargo body thereof and the cab thereof supported on the same chasis. The vane assembly of this embodiment, (3), of this invention is shown in the drawings of FIGS. 21 and 22 and is generally indicated at 250. It includes portions of vane assemblies previously described in conjunction with the first embodiment, (1), of this invention. The vane assembly of this embodiment, (3), includes a forward vane assembly 20 on the forward portion of the truck cab above the windshield area, corner vane assembly 24 on the corners of the cargo body, and a roof top vane assembly 260 having vertically oriented vanes that is mounted on or over a forward surface of the cargo body. The truck has a cab 262 and cargo body 264 mounted on the same chasis with the cab 262 being adjacent to the cargo body 264. The cargo body 264 extends beyond the dimensions of the cab 262 as shown. This embodiment 250 is adapted to turn air currents which strike the forward surface of the truck cab turning them over the top of the cab to the vane assembly 260 above the roof of the cab which turns the air currents and directs them toward the sides of the cargo body over its forward surface and further to turn the air currents around the corners of the cargo body to its sides when the truck is in forward motion. The vane assembly 250 functions generally similar to the previously described vane assemblies in that it has a similar effect on reducing air drag forces on the vehicle when in forward motion.

The forward vane assembly of this embodiment, (3), is the same as the forward vane assembly shown in FIG. 4 and described in detail with the first embodiment, (1), of this invention. The forward vane assembly is indicated at 20 and is preferably mounted as shown in detail in FIG. 4 above and spaced from the upper forward corner of the cab. The forward vane assembly 20 includes a vane member 108 with support members 110 and 112 attaching it to the truck cab 262. The vane 108 preferably extends completely across the cab 262 terminating at or near the sides of the cab. The vane 108 has a leading edge portion 114 terminating in the vicinity of the cab's windshield and a trailing edge portion 116 terminating above the cab's roof. The vane 108 is spaced away from the corner portion of the cab so the upwardly moving air on the cab's windshield can be turned to pass over the roof in a rearward direction. As shown in FIG. 21 the forward vane 108 is constructed in a swept back configuration to conform with the shape of the forward portion of the cab. Some styles of truck cabs for this type of truck have the windshield portion thereof swept back slightly and the forward vane 108 must be shaped accordingly. For those styles of trucks which have the windshield portion of the cab straight across the forward vane assembly 20 should be constructed with the forward vane 108 in a straight configuration. It is to be noted that the forward vane 108 provides an air current turning device and a sun shade or sun visor for the windshield of the truck cab.

The drawings show the forward vane assembly 20 in this embodiment, (3), of the invention having a single vane 108 mounted above the upper forward corner of the truck cab 262. It is to be understood that the forward vane assembly 20 can be constructed with multiple vanes in a stacked relation similar to the vane assemblies with multiple vanes as described in detail hereinbefore in conjunction with the other embodiments, (1 and 2), of this invention. In a multiple vane configuration the lowermost vane thereof could be supported somewhat as shown in FIGS. 21 and 22 with the other vane or vanes attached to it.

The cargo body corner vane assembly 256 is mountable on the forward corners of the truck's cargo body 264 it is similar to the trailer vane assembly 24 shown in FIG. 1, 3, 13 and 15 and described in conjunction with the first embodiment, (1), of this invention. The corner vane assembly 256 is structurally the same as the trailer vane assembly 24 and it is shown in FIGS. 21 and 22 of the drawings with the same descriptive numerals. The structure of the cargo body 264 of the truck shown in FIGS. 21 and 22 can be substantially the same as the structure of the trailer shown with the first embodiment, (1), of this invention. FIG. 15 shows in detail an end view of the vane assembly as mounted with the trailer structure; this is applicable to the corner vane assembly 265 structure with the truck cargo body 264. The corner vane assembly functions to turn air moving outward on the forward surface of the cargo body 264 to turn same around the corners thereof 266 and 268 to the sides thereof 270 and 272 respectively. It is to be noted that generally the cargo bodies of this type of truck are constructed to the maximum allowable width thus the vanes 150 and 151 of the corner vane assembly 256 are constructed so they will not have any portion thereof extending past the cargo body sides 270 and 272 respectively. Some trucks of the general type shown have the cab extending to the full width of the cargo body; for these particular trucks the corner vanes can only extend above the cab along the corners of the cargo body.

FIG. 15 shows in detail a corner vane assembly 152, the vane support and moving apparatus is generally indicated at 154 and the vane 152 shown in an extended position in solid lines and in a retracted position in dashed lines. The vane supporting and moving apparatus 154 has a linkage mechanism controllable to selectively extend and retract the vanes and thereby adjust the angle of attack of the individual vanes relative to the forward surface of the cargo body 264. The vane apparatus shown in FIG. 15 is representative of both of the corner vanes of this embodiment, (3), as well as for the previously described embodiment, (1), of this invention. The moving apparatus 154 has a link member 156 pivotally attached to the trailing edge portion of the link that is pivotally mounted on the forward surface of the cargo body. A stop member 160 extends from the corner portion of the cargo body and will contact the link 156 so as to limit outward movement of the vane. A servo 162 pivotally attached to the cargo body by a mount 163. The servo 162 is connected to the leading edge portion of the vane 152 by an actuator arm 164, a wobble joint 166 and a pair of link members 168 and 170. The wobble joint attachment of the vane leading edge portion with the servo 162 allows the vane 152 to be moved from the extended position to the retracted position with the link member 168 moving in a slotted mount 172 on the forward surface of the cargo body. When the vane 152 is in the general position shown in the solid lines of FIG. 15 the height of the leading edge portion above the forward surface of the body can be adjusted thereby adjusting the angle of attack for the vane in the air flow on the forward surface of the cargo body. The servo 162 is preferably a type which will allow selective adjustment of the actuator arm 146 so the angle of attack of the vane can be precisely changed to obtain an optimum result. Preferably, the servo 162 is remotely controllable such as from inside the truck cab. When the corner vanes 150 and 151 are in the extended position they will cause air flowing outward on the cargo body's forward surface to be turned around the corners thereof 266 and 268 thus providing a stabilizing influence on the vehicle. Additionally, as air flows past the corner vane assembly 256 the orientation of the vanes will produce forwardly and outwardly directed forces pulling on the cargo body 264 which aid in lateral stability of the vehicle and provide forwardly directed forces to aid in moving the vehicle in a forward direction.

The roof top vane assembly or cargo body center vane assembly 260 is shown in FIG. 20, 21 and 22. FIG. 20 shows an end elevation view of the vane assembly 260 taken from and end thereof. The vane assembly 260 has a frame structure 274 with a plurality of vanes 276 mounted thereon and the V-shaped configuration shown in FIG. 20. The vane assembly 260 has two banks of multiple vanes mounted with the frame structure 274 in a V-shaped arrangement as shown with the vane assembly adapted to be mounted in a generally vertical position on or over a forward surface of the truck as over the cab 262 or in the case of a truck having the cargo body extending over the roof of the cab in the forward most surface of the cargo body.

The vane assembly 260 of this embodiment, (3), is adapted to receive a rearwardly moving air current passing over the roof of the truck cab 262 and turn same ninety degrees to the side so the air current will move adjacent to the forward surface of the cargo body 264 at a velocity higher than its velocity before turning. The general function of the vane assembly 260 is to turn the air current which normally strikes the forward surface of the cargo body 264 and direct it to the sides of the cargo body.

The structure of the vane assembly 260 generally includes two banks of multiple vanes pivotally supported on the frame structure 274 in the V-shaped configuration shown in FIG. 20. The frame structure 274 has a rear-mount member 278 and a central member 280 with the vanes 276 being pivotally mounted on support member 282 and 284. The support members 282 and 284 are pivotally attached to the frame structure 274 at the central member 280 in the V-shaped configuration shown. The support members 282 pivotally secured to a mount 286 on the outer end of the center member 280 and the other support members 284 are pivotally secured to mounts 288 on the rear mount member 278. The support members 284 are attached to brace members 290 connecting them with the back member 278. The brace members 290 are provided with a plurality of apertures 292 in the outer or forward end portions thereof for the purpose of adjustment of the position of the vanes 276. The plurality of vanes 276 is provided with rigidly mounted inner vane members 294 and 296 at the pivot points of the support members 282 and 284 in the center portion of the frame structure as shown. One bank of vanes has three vanes shown attached to the support members 282 and 284 above the center vane 294, with the vanes indicated at 298, 300 and 302. The opposite bank of vanes is similarly constructed having three vanes above the rigidly mounted center vanes 296 with the vanes indicated at 304, 306 and 308. The plurality of vanes 276 are pivotally attached to the support members 282 and 284 in the pivotal parallelogram configuration as previously described in conjunction with the discussion of the other multiple vane structures of this invention. The particular vanes shown in FIG. 20 with the roof top vane assembly 260 have an elongated or extended trailing edge portion as indicated at 310 to lessen the amount of burbling of air as it moves from the vane assembly and to lessen the amount of overturn in the deflecting of the air currents. The roof top vane assembly 260 is constructed so that the rear mount member 278 can be attached to the forward surface of the cargo body 264 with the vanes supported immediately above the roof of the truck cab 262 in the positions shown in FIGS. 21 and 22.

It is to be noted that the roof top vane assembly 360 can be constructed with the several vane shapes shown in FIGS. 5, 6 and 7 or other shapes as desired. Additionally the roof top vane assembly as shown in FIG. 20 is provided with rigid brace members 290 for support of the vanes 276 and their angular relation, however, it is to be understood that a servo actuated linkage mechanism can be substituted for the braces 290 so as to provide for remote controlling of the position of the vanes. Obviously it would be an advantage to have the vane assembly adjusted from inside the cab of the truck so it can be adjusted in position while the truck is in motion and it can be adjusted as needed to change the angular position of the vanes as needed to drive the truck partially into a garage.

It is to be noted that the roof top vane assembly 260 of this embodiment, (3), can be used with a tractor-trailer truck of the general type shown in FIG. 1 by mounting same on the front of the trailer. The roof top vane assembly 260 would in this application deflect air over the forward surface of the trailer to the sides thereof for reducing air drag forces on the trailer.

The entire vane assembly 250 of this embodiment, (3), is adapted for use with trucks of the general character shown in FIGS. 21 and 22 and functions to deflect the air current moving in opposition to forward motion of the truck. The general function of the vane assemblies 20, 256 and 260 of this embodiment of this invention are adapted to direct air currents over the forward portion of the truck cab, across the forward surface of the cargo body, and around the corner portions of the cargo body to have the overall result of reducing the air drag resistance forces onto the vehicle when in forward motion. It is to be noted that the vane assembly 250 of this embodiment, (3), can be used with trucks having a solid sheet covered body or a stake body as is common on farm trucks. The structure of the vane assembly 250 is such that it can be moved with either the solid type body or the stake type body and in either case functions similarly. Also it is to be noted that the vane assemblies of this embodiment, (3), can be used on a truck of the general type shown which has the cab thereof extending the full width of the cargo body.

In a forth embodiment, (4), of the air turning and drag reducing vane assembly of this invention, generally indicated at 252, it is adapted to be used with a truck having the cab and carbo body thereof mounted on the same chasis. The vane assembly of this embodiment, (4), of this invention is shown in FIG. 23; it includes portions of vane assemblies previously described in conjunction with the first described embodiment, (1), of this invention. The vane assembly of this embodiment, (4), includes a forward vane assembly 20 on the forward portion of the truck cab above the windshield area, a roof top vane assembly 22 mounted on the roof of the truck cab, a corner vane assembly 256 on the corners of the cargo body, and a cargo body or vehicle top vane assembly 320. The vane assembly of this embodiment 252 is adapted to turn air currents which strike a forward portion of the cab in the windshield area turning them rearwardly onto the top of the cab to the roof top vane assembly 22 which turns air currents moving rearwardly over the top of the cab to an upward direction so as to pass over the front of the cargo body to the top vane assembly 320 which turns the upwardly moving air currents rearwardly over the top of the cargo body while the corner vane assembly 256 turns the air currents moving to the side over the forward surface of the cargo body around the forward corners thereof to the sides thereof. The vane assembly 252 functions generally similar to the previously described vane assemblies in that the air currents are deflected around the vehicle to reduce air drag forces on the vehicle when in forward motion.

The forward vane assembly 20 of this embodiment, (4), is the same as the forward vane assembly described with the first embodiment, (1), of this invention and shown in FIG. 4. The forward vane assembly 20 is preferably mounted as shown in detail in FIG. 4 in relation to the upper forward corner of the truck cab in the windshield area. The forward vane assembly 20 has a vane member 108 mounted above the truck cab 262 by support members 110 and 112. The vane 108 preferably extends completely transversely across the truck cab 262 terminating at or near the sides of the cab. The vane 108 has a leading edge portion 114 in the vicinity of the windshield and a trailing edge portion 116 terminating above the roof of the cab. The vane 108 is supported in a spaced relation to the forward corner portion of the cab so it will turn and direct the air moving upward on the windshield so as to turn it to pass rearwardly over the roof of the cab. The forward vane 108 functions as an air current turning device and a sun shield or sun visor for the windshield of the truck cab. The vane assembly 20 should be constructed with the vane thereof in a uniform spaced relation to the forward edge of the cab.

In this embodiment, (4), of this invention, the forward vane assembly 20 is shown having a single vane member 108. It is to be understood that the forward vane assembly 20 can be constructed in a multiple vane configuration with vanes in a stacked manner generally similar to the multiple vane assemblies shown and described in detail here and before and in conjunction with the other embodiments 1, 2 and 3 (of this invention). In a multiple vane configuration the lowermost vane of the forward vane assembly 20 could be supported as somewhat shown in FIG. 23 with the other vanes pivotally attached to it and extending in a generally upward direction.

The roof top vane assembly 22 of this embodiment, (4), is the same as the roof top vane assembly of the first embodiment, (1), and shown in FIGS. 1, 3, 13 and 14. The roof top vane assembly is preferably mounted at the rear of the truck cab 262 and is provided with vanes to turn an oncoming air current ninety degrees to pass upward on the forward surface of the cargo body 264. The forward vane assembly 22 is shown in detail in FIG. 14 and is used in this embodiment, (4), with vanes 121, 122, 123, 124 and 125 which are constructed generally similar to those shown in FIGS. 6 which are adapted to turn an air current 90° and the roof top vane assembly as shown in FIG. 23 as the frame thereof 120 attached to the roof of the truck cab with the vane support members 126 and 128 held in position by a brace 130. The vanes of the roof top vane assembly 22 preferably extend the width of the truck cab so as to deflect a maximum amount of air. It is to be noted that with the application of the roof top vane assembly to this particular type of truck the vanes can extend past the width of the cab as this type of truck cab is usually narrower than the cargo body. In FIG. 23 the brace member 130 supports the vanes in a fixed position relative to the mount 120 and a truck cab 262. The brace structure is shown to indicate one manner in which the vanes can be supported in a rigid position. It is to be understood that other structures than the brace member 130 can be used to support the vanes. Another such manner of supporting the vane assembly is to use an air operated motor or air operated servo and an appropriate linkage mechanism to provide a remotely adjustable structure. The vane assembly 22 can be pivoted as previously described and as shown in FIG. 14 between an upright position, an intermediate position, and a lowered position.

The cargo body corner vane assembly 256 is mounted on the forward upright corners of the trucks cargo body 264 and is generally shown to the trailer vane assembly 24 of the first embodiment, (1), of this invention in FIGS. 1, 3, 13 and 15. The corner vane assembly 256 is structurally the same as the trailer vane assembly 24 shown in FIGS. 13 and 15 with the same descriptive numerals that are used in conjunction with the description of the trailer vane assembly 24. The structure of the cargo body 264 of the truck shown in FIG. 23 can be substantially the same as the structure of the trailer shown and described with the first embodiment, (1), of this invention. It is to be noted that the structure of the cargo body 264 can be a structurally enclosed box-type body or it can be a perforate body such as a stake type body, or it can be a frame type body which is covered with canvas of the like. In order to use the corner vane assembly 256 of this embodiment, (4), of this invention, with a stake type body or a frame type body adequate support for the vanes thereof and actuator thereof would be necessary. The FIG. 15 shows in detail an end view of the corner vane assembly as mounted with the trailer structure and as is applicable to the use of this vane assembly with the truck cargo body 264. The corner vane assembly 256 functions to turn an air current which is moving to the side on the forward surface of the body to direct the air current around the corners of the cargo body to the sides of same. Some trucks of the general type shown have the cab extending the full width of the cargo body; for these particular trucks the corner vanes can only extend above the cab along the corners of the cargo body.

FIG. 15 shows in detail the structure of a corner vane 152, the vane support and moving apparatus generally indicated at 154, and a portion of a supporting structure. The vane shown in FIG. 15 is illustrative of the vane and supporting apparatus used on both corners of the vehicle. The vane supporting and moving apparatus 154 is a linkage mechanism controllable to selectively extend and retract the vanes and adjust the angle of attack of the individual vanes relative to the forward surface of the cargo body 264. The moving apparatus 154 has a link member 156 pivotally attached to the trailing edge portion of the vane and pivotally attached by a mount 158 to the cargo body 264. A stop member 160 extends from the corner portion of the cargo body to contact the link 156 so as to limit outward movements of the vane 152. The servo 162 is pivotally attached to the cargo body by a mount 163 and is connected to the leading edge portion of the vane 162 by an actuator arm 164, a wobble joint 166 and a pair of link members 168 and 170. The link member 168 moves in a slotted mount 172 on the forward surface of the cargo body. The wobble joint attachment of the vanes leading edge portion to the servo 162 allows the vanes to be moved from the extended position to a retracted position against the cargo body's forward surface. With a vane in the extended position its angle of attack relative to the forward surface of the cargo body can be adjusted by the servo 162. Preferably the servo 162 is of a type that will allow selective and precise movements of the actuator arm 164 from a remote location. When the corner vanes are in the extended position they will cause air flowing outward on the forward surface of the cargo body to be turned around the forward corners of the cargo body. Turning air around the corners of the cargo body will provide a stabilizing influence in the lateral direction on the vehicle and provide forwardly directed forces to aid in moving the vehicle in a forward direction. It is to be noted that the cargo body 264 of this type of truck vehicle is usually constructed to the maximum allowable width thus the vanes of the corner vane assembly 256 are constructed so that they will not have any portion thereof extending past the sides of the cargo body.

The cargo body top vane assembly 320 is mounted on the upper forward corner portion of the trucks cargo body 264 as shown in FIG. 23. The cargo body top vane assembly 320 is adapted to receive the upwardly moving air current on the forward surface of the cargo body from the roof top vane assembly 22 and turn it to move a generally rearward direction over the top of the cargo body. This top vane assembly 320 is constructed with a mount 330 rigidly attached to the forward top corner portion of the cargo body and a pair of vane support members 332 and 334 pivotally attached thereto and extending upward to support the vanes 335, 336 and 337. The lowermost vane 337 is rigidly attached to the mount 330 with the other vanes pivotally supported thereabove in the previously described parallelogram relationship. The vanes 335, 336 and 337 of the top vane assembly 320 are preferably pivotally connected in the parallelogram relationship as previously described in conjunction with the multiple vane assemblies of the other embodiments of this invention. The vanes 335, 336 and 337 preferably extend the width of the cargo body 264 so as to deflect the upwardly moving air currents completely across the vehicle to turn them in a rearward direction over the top of the cargo body.

The body top vane assembly 320 preferably have the vanes thereof shaped so as to deflect the air current 90°. A brace member 340 is connected with a forward extending member 331 of the mount 330 to the vane support member 334 to hold the vanes in a rigid position relative to the mount 330. Ordinarily, the top vane assembly 320 will have the vanes thereof kept in a fixed position when in use, however, it may be necessary to raise or lower the vanes in order to move the vehicle into a garage or the like, in such instance in for such purpose the brace member 34 is preferably detachable so the vane assembly can be pivoted to lower the overall effective height of the vehicle. The particular structure of the mount 330 as shown is such that the vanes can be lowered to nearly the level of the top of the cargo body when the brace 340 is detached.

In use of the air deflecting vane assembly 252 of this embodiment, (4), of this invention it will substantially reduce the air drag forces on a truck while operating at highway speeds. The several individual vane assemblies of the entire vane assembly function cooperatively to direct the flow of air around the cab and the cargo body of the truck. The forward vane assembly 20 is adapted to turn an upwardly moving air current passing over the vehicles windshield and direct it rearwardly over the roof of the cab 262. The roof top vane assembly 22 is adapted to receive the rearwardly moving air from the forward vane assembly 20 and air from the space thereabove which is also moving rearwardly relative to the truck and directs it upwardly over the forward surface of the cargo body to 64. The body top vane assembly 320 is adapted to receive the upwardly moving air from the roof top vane assembly 22 and other air moving upwardly on the forward surface of the cargo body to direct it rearwardly over the top of the cargo body 264. The corner vane assembly 256 is adapted to receive air which is moving on the forward surface of the cargo body and in the direction of the sides of the cargo body and direct it around the corners of the cargo body to the sides thereof. The air currents on the forward surface of the cargo body 264 are formed by air flow around the sides of the truck cab 262 and other air flow moving in a rearward direction between the truck cab and the sides of the cargo body.

In a fifth embodiment, (5), of the air current turning and drag reducing vane assembly of this invention such is adapted for use with vanes and similar vehicles which have unit like bodies of an elongated and relatively uniform cross-sectional shape with a bluff front surface; the vane assembly is generally indicated at 254 and is shown in FIG. 24. The vane assembly of 254 of this embodiment includes portions of vane assemblies previously described in conjunction with the first embodiment, (1), of this invention. The vane assembly of this embodiment, (5), includes a nose vane assembly 18 on the forward portion of the van 360 and a vane assembly 20 on the upward forward corner of the van. This embodiment of the vane assembly 254 is adapted to turn air currents which strike the forward surface of the vehicle and turn them to pass upward over the windshield area by the nose vane assembly 18 and to further turn the upwardly moving air currents by the forward vane assembly 20 to direct them to pass rearwardly over the roof of the vehicle. The vane assembly 254 functions generally similar to the previously described vane assemblies of the other embodiments of this invention in that it has a similar effect on reducing the air drag forces on the vehicle when in forward motion by deflecting air currents around the vehicle.

The nose vane assembly 18 of this embodiment, (5), is the same as the nose vane assembly in the first embodiment, (1), shown in detail in FIG. 2. The nose vane assembly 18 is preferably mounted generally as shown in FIG. 2, that being positioned above the air inlet for the vehicles radiator. The nose vane assembly as shown has three vanes indicated at 50, 52 and 54. The vanes 50, 52 and 54 are supported by elongated support members 58 and 60 which are pivotally attached at one end to the mount 56. The lowermost vane 54 of the vanes in this assembly is rigidly attached to the mount 56 with the other vanes are pivotally attached thereto in the parallelogram relationship as shown. An upper mount 62 is attached to the forward surface of the van 360 and has a adjusting bar member 64 attached thereto and connected with the support member 60 for use in adjusting the pivotal position of the vanes relative to the forward surface of the van. Preferably the nose vane assembly 18 has the vanes thereof extending substantially the width of the vehicle. Depending upon the specific structure of the van or similar vehicle it may be necessary to separate the vane assembly 18 into two separate vane assemblies each spaning one half the width of the vehicle or it may be possible to use a single vane assembly expanding the entire width. Some vans are generally pointed on the forward surface while others are relatively flat.

The specific structure arrangement of the vanes 50 and 52 and 54 and their support on the mount 56 is an important feature of the nose vane assembly 18. Pivoting of the vane will control the velocity of the air current exiting the vane assembly and will consequently control the velocity of the air current moving upward on the forward surface of the vehicle. An adjustment of the angular placement of the nose vanes controls the air current velocity on the front of the vehicle which will in turn control to some extent the amount of air drag reduction possible to this vane assembly 254. As shown, the nose vane assembly is provided with three vane members, however, it is to be understood that the nose vane assembly can have a greater number of vanes or a fewer number of vanes as necessary. The aerodynamics of the particular vehicle on which the nose vane assembly 18 of this embodiment, (5), is used will determine the number of vanes necessary for the nose vane assembly 20.

The forward vane assembly of this embodiment, (5), is the same as the forward vane assembly of the first embodiment, (1), and shown in detail in FIG. 4. The forward vane assembly 20 is mounted in a spaced relation above the upper forward corner of the vehicle, above the windshield area, as shown in detail in FIG. 4. The forward vane assembly 20 includes a vane member 108 and supporting members 110 and 112 mounting it with the vans forward upper corner portion 364 as shown. The vane 108 preferably extends completely across the vehicle terminating at or near the sides thereof. The vane 108 has a leading edge portion terminating in the vicinity of the vehicles windshield and a trailing edge portion 116 terminating above the roof of the vehicle. Spacing of the vane 108 relative to the van's forward portion 364 is such that it will turn and direct the upwardly moving air current on the forward surface 362 so as to turn it to pass rearwardly over the roof 366 in a rearward direction.

FIG. 24 shows the forward vane assembly 20 having a single vane 108 mounted above the vehicles forward corner portion 364. It is to be understood that the forward vane assembly 20 of this embodiment, (5), can be constructed in a multiple configuration having a plurality of vanes mounted in a stacked relation similar to the multiple vane assembly of the other embodiments of this invention.

In use of the vane assembly 254 of this embodiment, (5), of this invention it will substantially reduce the air drag forces on a van or similar type vehicle when operating it at highway speed. The individual vane assemblies 18 and 20 of the entire drag reducing vane assembly 254 functions cooperatively to deflect the air in a streamline flow over the vehicle. The nose vane assembly 18 functions to turn the air current striking the forward surface 362 of the vehicle directing it in a high velocity stream upward over the windshield area of the vehicle to the forward vane assembly 20. The forward vane assembly 20 is adapted to turn the upwardly moving high velocity air current from the front surface 362 of the vehicle to direct it rearwardly over the roof 366. The cooperative effect of the individual vane assemblies 18 and 20 of the vane assembly 254 of this embodiment is to deflect the air current normally striking the forward surface of the vehicle and directing it up and over the vehicle. The vane assembly 254 of this embodiment is shown and described with a van type vehicle 360, however, it is to be understood that the vane assembly can be used with other vehicles having the same external structural appearance, namely a generally bluff front surface and an elongated rearwardly extending portion of a generally cross-sectionally uniform shape. Other vehicles on which the vane assembly 254 could be used are buses, motor homes, and certain styles of automobiles. All of which generally have the described configuration.

In the manufacture of the air current deflecting or air drag reducing vane assemblies of the embodiments of this invention, it is obvious that the vane assemblies are structurally simple and can be easily constructed to achieve the end products for use with vehicles to achieve the end result of reducing the air drag of a vehicle. The several vane assemblies of the embodiments of this invention each must be constructed separately yet each is constructed in a generally similar manner. The vane assembly can be constructed so they will be mountable with different styles and makes of vehicles of the same general catagory and type. The specific vane structures of the vane assemblies can be constructed in any of several forms having any of several particular cross-sectional shapes as desired by the user and depending upon the particular service in which the particular vane assembly is to be used. The specific construction of the vanes is a matter to be determined by the user; for instance the vanes can be extruded in aluminum or plastic materials or they can be formed of a piece of sheet metal such as aluminum or tin, or they can be constructed of a reinforced plastic materials. The vane nose vane structures and roof top vane structures are shown herein with the vanes being mounted at the ends thereof and pivotally attached to support members. It is to be understood that the vanes can be mounted by an appropriate structure to support them at mid-portions thereof in a similar pivotal arrangement without departing from the scope of the invention. Supporting the vanes at mid-points would allow the vanes to be constructed to a maximum width.

In the use and operation of the drag reducing vane assemblies of the embodiments of this invention, it is seen that same provides a means of reducing the air drag forces on a vehicle and on a vehicle when pulling a trailer which gives the overall result of providing a more economical operation for the vehicle. As set forth and described in the example relative to the tractor-trailer vehicle with some of the vane assemblies of this invention thereon it is shown that the vane assemblies do produce a reduction in the air drag forces on the vehicles and will produce a more economical operation.

As it will become apparent from the foregoing description of the applicant's air current deflecting or air drag reducing vane assembly in the several embodiments thereof, a relatively simple and well designed means has been provided to reduce the air drag forces on a vehicle. The several embodiments of the air current deflecting or air drag reducing vane assembly are easily mounted with vehicle structures and can be constructed to be remotely controlled in their angular position relative to the vehicle structures for use under different operating conditions. The air drag reducing vane assemblies of the embodiments of this invention are adapted to in use reduce the air drag forces on vehicles and on vehicles pulling trailers when in forward motion such as operating in an on-the-road condition by deflecting air currents to move in a streamline flow.

While the invention has been described in conjunction with preferred specific embodiments thereof, it will be understood that this description is intended to illustrate and not limit the scope of the invention, which is defined by the following claims.

I claim:

1. An air current deflecting means for a tractor of a tractor trailer vehicle, comprising:
   a. a roof top air current deflecting means mountable on a tractor of a tractor-trailer vehicle having a support means having means to mount same above the roof of said tractor, said deflecting means having a plurality of vane members mounted in a parallel relation on said support means,
   b. said vane members each having a leading edge, a trailing edge, a forward surface and a rear surface, said forward and rear surfaces being rearwardly curved,
   c. said support means having a frame securable to said vehicle roof and having a pair of vane support members pivotally mounted on said vane support means extending upward therefrom, said pair of vane support members pivotally mounting leading edge portions and trailing edge portions of said vane members with said leading edges and said trailing edges being parallel and being essentially parallel to said roof, means with said support means to move said plurality of vanes as a group in a pivoting motion above said roof,
   d. a forward air current deflecting means having a forward vane mountable on a forward portion of said vehicle in a spaced relation to a forward corner portion of the roof of said vehicle and adjacent to the windshield of said vehicle, said forward vane having a leading edge, a trailing edge, a forward surface, a rear surface with said forward surface and said rear surface being generally upwardly and forwardly curved, said forward vane being constructed and adapted to turn an air current moving generally upward on said windshield so as to direct same onto said roof,
   e. a nose air current deflecting means having a nose vane mount means mountable on a forward portion of the nose of said vehicle, having a nose vane support means pivotally mounted on said nose vane mount means, said nose vane mount means mounting a plurality of nose vanes in a parallel spaced relation, said nose vanes each having a leading edge, a trailing edge, a forward surface and a rear surface, said forward and rear surfaces being generally rearwardly and upwardly curved, said nose air current deflecting means being constructed and adapted to in use turn an air current moving toward said nose of said vehicle turning same to a direction upon and generally along said forward end portion of said vehicle.

2. The air current deflecting means of claim 1, wherein:
   a. said tractor is connected in towing relation with a trailer,
   b. said air current deflecting means has a corner air current deflecting means mountable on a forward corner portion of said trailer, c. said corner air current deflecting means has a corner vane mounting means mountable on a forward upright corner portion of said trailer with an elongated corner vane mounted thereon in a spaced relation to said upright corner portion, and d. said corner vane extends substantially the length of same said corner and has a leading edge, a trailing edge, a forward surface, and a rear surface, said forward and rear surfaces being generally forwardly and outwardly curved relative the center portion of said trailer with said leading edge forward and inward relative to said trailing edge, said corner air current deflecting means is constructed and adapted in use to turn an air current on a forward portion of said trailer and direct same around said corner to a side of said trailer.

3. The vane assembly of claim 2, wherein:
 a. said corner air current deflecting means has a pair of said corner vanes with one of said corner vanes being mounted on opposed sides of said trailer, and
 b. said corner air deflecting means mount means has means to move said corner vanes between a position adjacent to said trailer and a position assuming said spaced relation.

4. The vane assembly of claim 2, wherein:
 a. all said vanes have a cross-sectional shape of a low-speed airfoil having a generally blunt leading edge portion and a tapered trailing edge portion, and
 b. said vanes have a curved means line and are constructed and adapted in use to turn an air current at an angle of between 0° and 90° relative to the original direction of travel of some said air current.

5. The air current deflecting means of claim 1, wherein:
 a. said vehicle is a truck having a cab and a cargo body mounted on a chassis in an adjacent relation,
 b. said air current deflecting means has a vehicle body top air current deflecting means,
 c. said body top air current deflecting means has a body top vane mount means mountable on a forward transverse corner portion of said cargo body, a plurality of body top vanes pivotally mounted with said mount means in a parallel spaced relation to said forward transverse corner portion, said body top vane mount means having means to move said vanes relative to said cargo body and maintain said parallel space relation, and
 d. said body top vanes each have a leading edge, a trailing edge, a forward surface and a rear surface with said forward and rear surfaces being generally forwardly curved with said trailing edge being above and to the rear of said leading edge, said body top air current deflecting means is constructed and adapted to in use turn an air current that is moving upward over a forward portion of said cargo body directing same rearwardly over the top of said cargo body.

6. An air current deflecting means for a vehicle, comprising:
 a. an air current deflecting means having a support means having means to mount same above a vehicle roof,
 b. said deflecting means having a plurality of vane members in a parallel spaced relation mounted on said support means, each said vane members having a leading edge, a trailing edge, a forward surface, a rear surface, said rear and forward surfaces being rearwardly curved,
 c. said plurality of vane members are in two groups mounted in an opposed relation having said leading edges facing generally toward a forward end portion of said vehicle and having said trailing edges in an opposed relation pointing in the direction of opposite sides of said vehicle, said rear and said forward surfaces being rearwardly curved, and
 d. said support means has a frame securable to a supporting surface of said vehicle, a vane support means secured to said frame and extending forwardly and outwardly therefrom and mounting said vane members, said deflecting means being constructed and adapted to in use deflect air currents that move over the roof of a vehicle and direct same in streamline flow to reduce air resistance on said vehicle.

7. The vane assembly of claim 6, wherein:
 a. said vanes have a cross-sectional shape with a pointed and tapered leading edge portion and a trailing edge portion and a relatively thick center portion, and
 b. said vanes have a curved mean line and are constructed and adapted in use to turn an air current at an angle between 0° and 90° relative to the original direction of travel of some said air current.

8. The vane assembly of claim 6, wherein: said airfoil has the camber and basic thickness of a Clark-Y airfoil.

9. The air current deflecting means of claim 6, wherein:
 a. said vehicle is a truck having a cab and a cargo body mounted on a chassis in an adjacent relation, said cargo body having an upright forward portion,
 b. said air current deflecting means has a forward air current deflecting means having a forward vane mountable in a spaced relation on a forward portion of said cab adjacent to the windshield and roof thereof, said forward vane having a leading edge, a trailing edge, a forward surface, a rear surface with said forward surface and said rear surface being generally upwardly curved, said forward vane being constructed and adapted to in use turn an air current moving generally upward on said windshield so as to direct same onto said roof,
 c. said air current deflecting means has a corner air current deflecting means mountable on a forward corner portion of said cargo body,
 d. said corner air current deflecting means has a corner vane mounting means mountable on a forward upright corner portion of said cargo body with an elongated corner vane mounted thereon in a spaced relation to said upright corner portion, said corner vane has a leading edge, a trailing edge, a forward surface and a rear surface, said forward and rear surfaces being generally forwardly and outwardly curved relative the center portion of said cargo body with said leading edge forward and inward relative to said trailing edge.

10. The air current deflecting means of claim 9, wherein:
 a. said corner air current deflecting means has a pair of said corner vanes with one being mounted on each opposed upright corner of said cargo body, and
 b. said corner vane mounting means has means to move said corner vanes between a position adjacent to said cargo body and a position assuming said spaced relation.

11. An air current deflecting vane assembly for a vehicle, comprising:
   a. an air current deflecting means having a support means having means to mount same above a vehicle roof,
   b. said deflecting means has a plurality of vane members mounted in a spaced parallel relation on said support means above said roof, said vane members each having a leading edge, a trailing edge, a forward surface and a rear surface, said rear and forward surfaces being rearwardly curved,
   c. said support means has a frame securable to said vehicle roof, and a vane support means pivotally secured said frame extending upward therefrom and mounting said vane members,
   d. said vane support means has a pair of vane support members with one vane support member pivotally secured to said leading edge portion of said vane members and the other vane support member pivotally secured to said trailing edge portion of said vane members to maintain said vane members in said spaced parallel relation,
   e. said vane members being mounted with said vane support means having said leading edges and said trailing edges in a spaced parallel relation and essentially parallel to said roof,
   said deflecting means being adapted to in use deflect air currents that move over said roof and direct same in streamline flow to reduce the air resistance on said vehicle.

* * * * *